US008971172B2

(12) United States Patent
Sugawara

(10) Patent No.: US 8,971,172 B2
(45) Date of Patent: Mar. 3, 2015

(54) NETWORK AND FAULT RECOVERY METHOD

(75) Inventor: Eiji Sugawara, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 442 days.

(21) Appl. No.: 13/434,743

(22) Filed: Mar. 29, 2012

(65) Prior Publication Data

US 2012/0287779 A1 Nov. 15, 2012

(30) Foreign Application Priority Data

May 11, 2011 (JP) ................................. 2011-106651

(51) Int. Cl.
*G01R 31/08* (2006.01)
*H04L 12/437* (2006.01)

(52) U.S. Cl.
CPC .................................... *H04L 12/437* (2013.01)
USPC ............................ 370/216; 370/222; 370/223

(58) Field of Classification Search
None
See application file for complete search history.

(56) References Cited

U.S. PATENT DOCUMENTS

| | | | | |
|---|---|---|---|---|
| 6,147,968 | A * | 11/2000 | De Moer et al. | 370/225 |
| 7,483,440 | B2 * | 1/2009 | Choudhury et al. | 370/409 |
| 7,545,735 | B1 * | 6/2009 | Shabtay et al. | 370/217 |
| 2002/0181479 | A1 * | 12/2002 | Okuno | 370/404 |
| 2003/0031126 | A1 | 2/2003 | Mayweather et al. | |
| 2003/0179702 | A1 * | 9/2003 | Chi et al. | 370/218 |
| 2005/0094554 | A1 * | 5/2005 | Nakash | 370/222 |
| 2005/0201273 | A1 * | 9/2005 | Shimizu | 370/216 |
| 2007/0242604 | A1 * | 10/2007 | Takase et al. | 370/223 |
| 2008/0095047 | A1 * | 4/2008 | Skalecki et al. | 370/225 |
| 2008/0304407 | A1 * | 12/2008 | Umansky et al. | 370/222 |
| 2010/0214909 | A1 * | 8/2010 | Ceccarelli et al. | 370/228 |
| 2012/0008493 | A1 * | 1/2012 | Magill et al. | 370/225 |
| 2012/0207017 | A1 | 8/2012 | Ceccarelli et al. | |
| 2012/0287776 | A1 * | 11/2012 | Inaba | 370/217 |

FOREIGN PATENT DOCUMENTS

| | | |
|---|---|---|
| JP | 2004-533142 | 10/2004 |
| JP | 2007-228293 | 9/2007 |
| JP | 2007-282153 | 10/2007 |
| JP | 2010-515314 | 5/2010 |
| JP | 2011-015062 | 1/2011 |
| WO | WO-2008-080418 | 7/2008 |
| WO | 2010/116406 A1 | 10/2010 |
| WO | 2011/006541 A1 | 1/2011 |

OTHER PUBLICATIONS

Liu , G. et al., "draft-liu-mpls-tp-ring-protection-01[1]", MPLS Working Group; Sep. 25, 2010.
Umansky, Igor, et al., "draft-umansky-mpls-tp-ring-protection-switching-03[1]", Network Working Group; Aug. 23, 2010.
JPOA—Office Action dated Jul. 8, 2014 issued with respect to the basic Japanese Patent Application No. 2011-106651, with English translation.

* cited by examiner

*Primary Examiner* — Hassan Phillips
*Assistant Examiner* — Hicham Foud
(74) *Attorney, Agent, or Firm* — Fujitsu Patent Center

(57) ABSTRACT

A ring network of a multicast label switch path scheme includes a transmitting node and receiving nodes connected to form a ring. A signal input to the transmitting node is branched to be transmitted in first and second different directions to first and second receiving nodes through first and second working paths, respectively, in the ring network. The first and second receiving nodes define terminal points of the first and second working paths, respectively, from the transmitting node. A first backup path is set from the first receiving node to the transmitting node, and a second backup path is set from the second receiving node to the transmitting node. The first backup path is in an opposite direction to the first working path and the second backup path is in an opposite direction to the second working path.

8 Claims, 39 Drawing Sheets

FIG.12

| | LSP MANAGE-MENT # | NORMAL STATE ||||| FAULT STATE OF WORKING LSP IN A DIRECTION (WHEN THR-RQ IS RECEIVED) ||||| FAULT STATE OF WORKING LSP IN B DIRECTION (WHEN THR-RQ IS RECEIVED) |||||
|---|---|---|---|---|---|---|---|---|---|---|---|---|---|---|---|---|
| | | IN-PUT LIU | IN-PUT LBL | OUT-PUT 1-LIU | OUT-PUT 1-LBL | OUT-PUT 2-LIU | OUT-PUT 2-LBL | IN-PUT LIU | IN-PUT LBL | OUT-PUT 1-LIU | OUT-PUT 1-LBL | OUT-PUT 2-LIU | OUT-PUT 2-LBL | IN-PUT LIU | IN-PUT LBL | OUT-PUT 1-LIU | OUT-PUT 1-LBL | OUT-PUT 2-LIU | OUT-PUT 2-LBL |
| NODE #1 | 1 | P1-3 | - | P1-1 | 11 | P1-2 | 21 | SAME AS NORMAL STATE |||||| SAME AS NORMAL STATE |||||
| | 2 | P1-1 | 45 | | | | | |||||| |||||
| | 3 | P1-2 | 35 | | | | | |||||| |||||
| NODE #2 | 1 | P2-2 | 11 | P2-1 | 12 | P2-3 | - | SAME AS NORMAL STATE |||||| SAME AS NORMAL STATE |||||
| | 2 | P2-1 | 44 | P2-2 | 45 | P2-3 | - | |||||| |||||
| NODE #3 | 1 | P3-2 | 12 | P3-1 | 13 | P3-3 | - | SAME AS NORMAL STATE |||||| SAME AS NORMAL STATE |||||
| | 2 | P3-1 | 43 | P3-2 | 44 | P3-3 | - | |||||| |||||
| NODE #4 | 1 | P4-2 | 13 | P4-3 | - | P4-3 | - | SAME AS NORMAL STATE |||||| P4-2 | 13 | P4-3 | - | P4-1 | 31 |
| | 2 | P4-1 | 42 | P4-2 | 43 | | - | |||||| P4-1 | 42 | P4-2 | 43 | P4-3 | - |
| NODE #5 | 1 | P5-2 | 31 | P5-1 | 32 | | - | SAME AS NORMAL STATE |||||| SAME AS NORMAL STATE |||||
| | 2 | P5-1 | 41 | P5-2 | 42 | | - | |||||| |||||
| NODE #6 | 1 | P6-2 | 32 | P6-1 | 33 | P6-3 | - | P6-2 | 32 | P6-1 | 33 | P6-3 | - | SAME AS NORMAL STATE ||||
| | 2 | P6-1 | 23 | P6-3 | - | | 41 | P6-1 | 23 | P6-3 | - | P6-2 | 41 | ||||
| NODE #7 | 1 | P7-2 | 33 | P7-1 | 34 | P7-3 | - | SAME AS NORMAL STATE |||||| SAME AS NORMAL STATE |||||
| | 2 | P7-1 | 22 | P7-2 | 23 | P7-3 | - | |||||| |||||
| NODE #8 | 1 | P8-2 | 34 | P8-1 | 35 | P8-3 | - | SAME AS NORMAL STATE |||||| SAME AS NORMAL STATE |||||
| | 2 | P8-1 | 21 | P8-2 | 22 | P8-3 | - | |||||| |||||

FIG.13

| LSP MANAGEMENT NUMBER | INPUT LIU NUMBER | OUTPUT 1-LUI NUMBER | OUTPUT 2-LUI NUMBER |
|---|---|---|---|

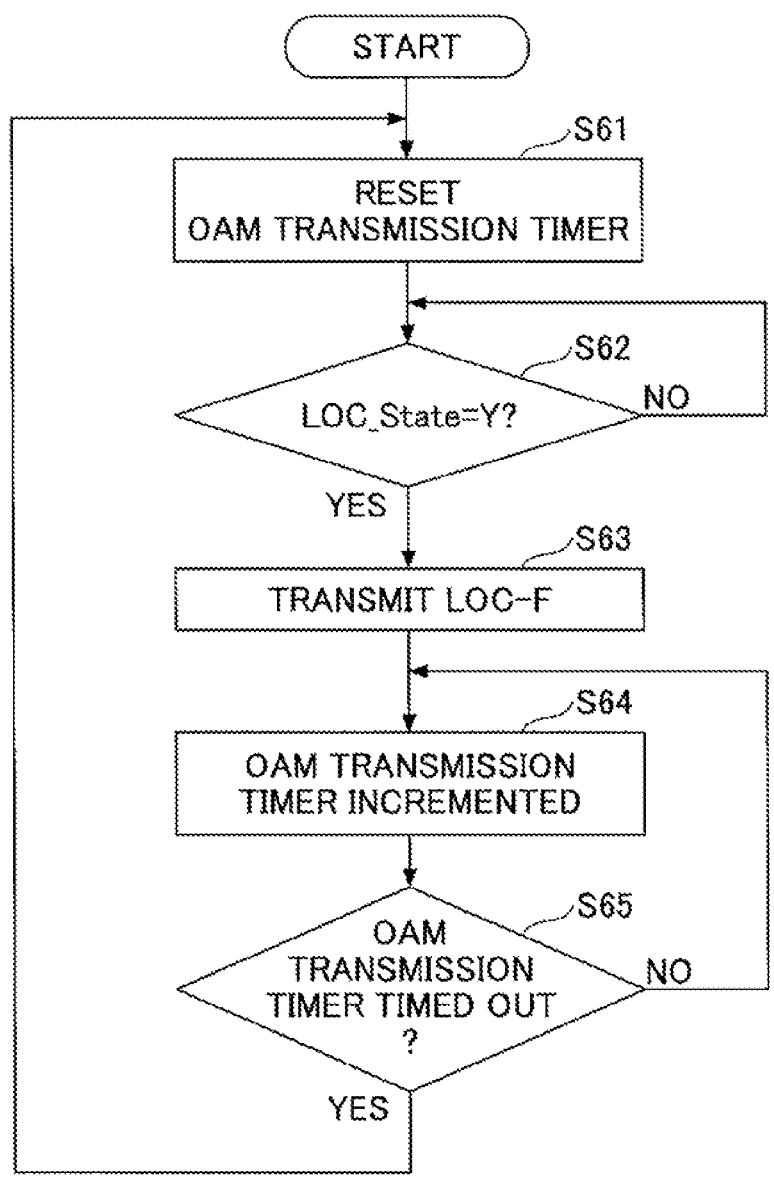

| | LSP MANAGE-MENT # | NORMAL STATE | | | | RECOVERING STATE OF WORKING LSP IN C DIRECTION (WHEN LOC-F/SW-RQ IS RECEIVED) | | | | RECOVERING STATE OF WORKING LSP IN D DIRECTION (WHEN LOC-F/SW-RQ IS RECEIVED) | | | |
|---|---|---|---|---|---|---|---|---|---|---|---|---|---|
| | | IN-PUT LIU | IN-PUT LBL | OUT-PUT 1-LIU | OUT-PUT 1-LBL | IN-PUT LIU | IN-PUT LBL | OUT-PUT 1-LIU | OUT-PUT 1-LBL | IN-PUT LIU | IN-PUT LBL | OUT-PUT 1-LIU | OUT-PUT 1-LBL |
| NODE #1 | 1 | P1-1 | 11 | P1-3 | | SAME AS NORMAL STATE | | | | SAME AS NORMAL STATE | | | |
| | 2 | P1-2 | 21 | P1-3 | | | | | | | | | |
| | 3 | | | P1-1 | 45 | | | | | | | | |
| | 4 | | | P1-2 | 35 | | | | | | | | |
| NODE #2 | 1 | P2-2 | 45 | P2-1 | 44 | P2-2 | 45 | P2-1 | 44 | SAME AS NORMAL STATE | | | |
| | 2 | P2-1 | 12 | P2-2 | 11 | P2-1 | 41 | P2-2 | 42 | | | | |
| | 3 | P2-3 | - | P2-2 | 11 | P2-3 | - | P2-1 | 44 | | | | |
| NODE #3 | 1 | P3-2 | 44 | P3-1 | 43 | P3-2 | 44 | P3-1 | 43 | SAME AS NORMAL STATE | | | |
| | 2 | P3-1 | 13 | P3-2 | 12 | P3-1 | 13 | P3-2 | 12 | | | | |
| | 3 | P3-3 | - | P3-2 | 12 | P3-3 | - | P3-1 | 43 | | | | |
| NODE #4 | 1 | P4-2 | 43 | P4-1 | 42 | P4-2 | 43 | P4-1 | 42 | SAME AS NORMAL STATE | | | |
| | 2 | P4-1 | 31 | P4-2 | 13 | P4-1 | 31 | P4-2 | 13 | | | | |
| | 3 | P4-3 | - | P4-2 | 13 | P4-3 | - | P4-1 | 42 | | | | |
| NODE #5 | 1 | P5-2 | 42 | P5-1 | 41 | SAME AS NORMAL STATE | | | | SAME AS NORMAL STATE | | | |
| | 2 | P5-1 | 32 | P5-2 | 31 | | | | | | | | |
| NODE #6 | 1 | P6-2 | 41 | P6-1 | 23 | SAME AS NORMAL STATE | | | | P6-2 | 41 | P6-1 | 23 |
| | 2 | P6-1 | 33 | P6-2 | 32 | | | | | P6-1 | 33 | P6-2 | 32 |
| | 3 | P6-3 | - | P6-1 | 23 | | | | | P6-3 | - | P6-2 | 32 |
| NODE #7 | 1 | P7-2 | 23 | P7-1 | 22 | SAME AS NORMAL STATE | | | | P7-2 | 23 | P7-1 | 22 |
| | 2 | P7-1 | 34 | P7-2 | 33 | | | | | P7-1 | 34 | P7-2 | 33 |
| | 3 | P7-3 | - | P7-1 | 22 | | | | | P7-3 | - | P7-2 | 33 |
| NODE #8 | 1 | P8-2 | 22 | P8-1 | 21 | SAME AS NORMAL STATE | | | | P8-2 | 22 | P8-1 | 21 |
| | 2 | P8-1 | 35 | P8-2 | 34 | | | | | P8-1 | 35 | P8-2 | 34 |
| | 3 | P8-3 | - | P8-1 | 21 | | | | | P8-3 | - | P8-2 | 34 |

FIG.23

NETWORK AND FAULT RECOVERY METHOD

CROSS-REFERENCE TO RELATED APPLICATION

This patent application is based upon and claims the benefit of priority of the prior Japanese Patent Application No. 2011-106651 filed on May 11, 2011, the entire contents of which are incorporated herein by reference.

FIELD

The embodiments discussed herein are related to a label-switched path network and a fault recovery method.

BACKGROUND

In recent years, with the advancement of the Ethernet (registered trademark) and IP (Internet Protocol) technologies, networks are rapidly becoming IP-based. This trend has been popular among network providers, so that the SDH (Synchronous Digital Hierarchy) transmission method is starting to be replaced with the packet transmission method, to address the increased demand for IP traffic of carrier networks and to enhance transmission efficiency for the purpose of reducing cost. The following describes the difference between the SDH transmission method and the packet transmission method in terms of transmission efficiency.

The SDH method is a technology based on TDM (time-division multiplex), which means time slots may be occupied (used) when there are no data to be transmitted. On the other hand, in the packet transmission method, when there is no data to be transmitted, the time slots may be used by another service; therefore the line (use) efficiency is improved.

In a carrier network, from the viewpoint of operational management, even when a packet transmission method is used, path control corresponding to the SDH method (i.e., static path setting) is to be performed. To meet this demand, a packet-based transport method called MPLS-TP (Multi Protocol Label Switching-Transport Profile) has been developed.

FIG. 1 indicates an example of a ring network, in which nodes #1 through #8 of the MPLS-TP scheme are connected in a ring shape by links #A through #H. FIG. 2 indicates a state where an LSP (Label Switch Path) is set in the network of FIG. 1, extending between node #1 and node #5 via nodes #2 through #4.

A carrier network is demanded to have high availability due to its nature. Actually, as indicated in FIGS. 3 and 4, there is a working LSP and a backup LSP. In FIG. 3, there is a working LSP in the A direction (clockwise direction) indicated by an arrow of a solid line, and a backup LSP in the B direction (counterclockwise direction) indicated by an arrow of a dashed line. At a receiving node (#5), signals of either the working LSP or the backup LSP are selected. Typically, a receiving node defining the terminal point is used for monitoring reception of a CCM (Continuity Check Message) packet of OAM (Operation, Administration, and Maintenance), which is a monitor control packet for a working LSP and a backup LSP, to perform fault recovery in units of LSP.

In FIG. 4, there is a ring-shaped working LSP in a clockwise direction indicated by an arrow of a solid line, and a ring-shaped backup LSP in a counterclockwise direction indicated by an arrow of a dashed line. When a fault occurs, the working LSP is connected to the backup LSP by a fault detection node, and fault recovery is performed by bypassing the fault section. In the fault recovery method of FIG. 4, signals do not flow into the backup LSP when a fault has not occurred, and therefore the line efficiency is higher than that of the fault recovery method of FIG. 3.

FIGS. 3 and 4 illustrate a fault recovery method of an LSP having a point to point configuration. However, there is demand for communication for performing multicasting to end users in the form of multimedia applications such as video streaming in a metro network and an internet protocol television (IPTV). Furthermore, in a cloud service, it is anticipated that demand will increase for 1:N connections, i.e., multicast communication. There are discussions of standardizing the recovery method of multicast communication at IETF, and various methods are being proposed (see, for example, non-patent document 1).

Incidentally, the following technology is proposed. There are multipoint logic paths not only for transmitting a frame transmitted from a transmitting terminal node to a multicast frame receiving terminal node, but also for transferring a frame to a transmitting terminal node by circulating a ring so as to terminate the frame also in the transmission terminal node. These multipoint logic paths are previously prepared for two routes of a working system and a backup system. A node which detects a fault transmits a forward fault notification frame to the multicast logic path where the fault has occurred. The transmission terminal node that has received the forward fault notification frame stops the use of the received multicast logic path and transmits the frame by a path which has not yet received the forward fault notification frame (see, for example, patent document 1).

Furthermore, the following technology is proposed. Along two or more paths in a network, communication signals are transmitted from ingress nodes to plural egress nodes. There is provided a primary path used for transmitting multicast communication signals along a communication link before a fault occurs in the network. There is also provided a backup path for transmitting multicast communication signals along a communication link. When a fault occurs, multicast communication signals are transmitted along the primary path at the same time as transmitting copies of the multicast communication signals along the backup path (see, for example, patent document 2).

Furthermore, the following technology is proposed. The node device operating as a working ring node or a backup ring node on the ring network is provided with a learning part for snooping and learning a message for performing data relay as data relay information before a fault occurs in the working ring node when the node device itself operates as a backup ring node, and a working/backup switching part for switching the node device from a backup ring node to a working ring node on the basis of the data relay information learned by the learning part when a fault occurs in a working ring node, in the case that the node device is operating as a backup ring node (see, for example, patent document 3).

Non-patent document 1: draft-liu-mpls-tp-ring-protection-01.txt
Non-patent document 2: draft-umansky-mpls-tp-ring-protection-switching-03.txt
Patent Document 1: Japanese Laid-Open Patent Publication No. 2007-282153
Patent Document 2: Japanese National Publication of International Patent Application No. 2010-515314
Patent Document 3: Japanese Laid-Open Patent Publication No. 2007-228293

FIG. 5 indicates a configuration of an LSP in conventional multicast communication. A ring-shaped working LSP in a clockwise direction indicated by an arrow of a solid line is used for delivering packets from a transmitting node #1 to nodes #2, #3, #4, #6, #7, #8.

In a fault recovery method indicated in FIG. 6, when a fault occurs, the working LSP is connected to the ring-shaped backup LSP in a counterclockwise direction indicated by an arrow of a dashed line, at a fault detection node #6. Accordingly, the fault section is bypassed so that fault recovery is performed. In a fault recovery method indicated in FIG. 7, a fault at link #F detected by a node #6 and a node #7 is reported to the transmitting node #1, and the signals are bridged to both the working LSP and the backup LSP at the transmitting node #1, so that fault recovery is performed.

In the fault recovery methods indicated in FIGS. 6 and 7, it is assumed that the signals indicated in FIG. 5 are multicast in one direction (clockwise direction) under normal circumstances. Accordingly, under normal circumstances indicated in FIG. 5, even though the node #8 is adjacent to the transmitting node #1 in terms of the ring topology, the path circulates the ring, and therefore a large transmission delay is caused.

Furthermore, when request signals and response signals that are delivered by multicast from terminals and devices are transferred to the terminals and devices that are the multicast delivery sources, the nodes #8, #7, #6, #4, #3, #2 of FIG. 5 are set as transmitting nodes, and the signals that are added (inserted) at the respective nodes #8, #7, #6, #4, #3, #2 are transmitted to the node #1 acting as a receiving node. In this case also, the path circulates the ring, and therefore a large transmission delay is caused.

SUMMARY

According to an aspect of the present invention, a ring network of a multicast label switch path scheme, includes a transmitting node and a plurality of receiving nodes connected to form a ring, wherein a signal input to the transmitting node is branched to be transmitted in first and second different directions to a first one and a second one of the receiving nodes through a first working path and a second working path, respectively, in the ring network, the first one and the second one of the receiving nodes defining terminal points of the first working path and the second working path, respectively, from the transmitting node, and a first backup path is set from the first one of the receiving nodes to the transmitting node, and a second backup path is set from the second one of the receiving nodes to the transmitting node, wherein the first backup path is in an opposite direction to the first working path and the second backup path is in an opposite direction to the second working path.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 12 indicates LSP management information according to a first embodiment;
FIG. 13 indicates an in-device header according to an embodiment;
FIG. 16C is a flowchart of an OAM packet transmitting process executed by a node defining a terminal point of a working LSP;
FIG. 23 indicates LSP management information according to a second embodiment.

DESCRIPTION OF EMBODIMENTS

Preferred embodiments of the present invention will be explained with reference to accompanying drawings.

Configuration of Ring Network

First Embodiment

Figure 1:
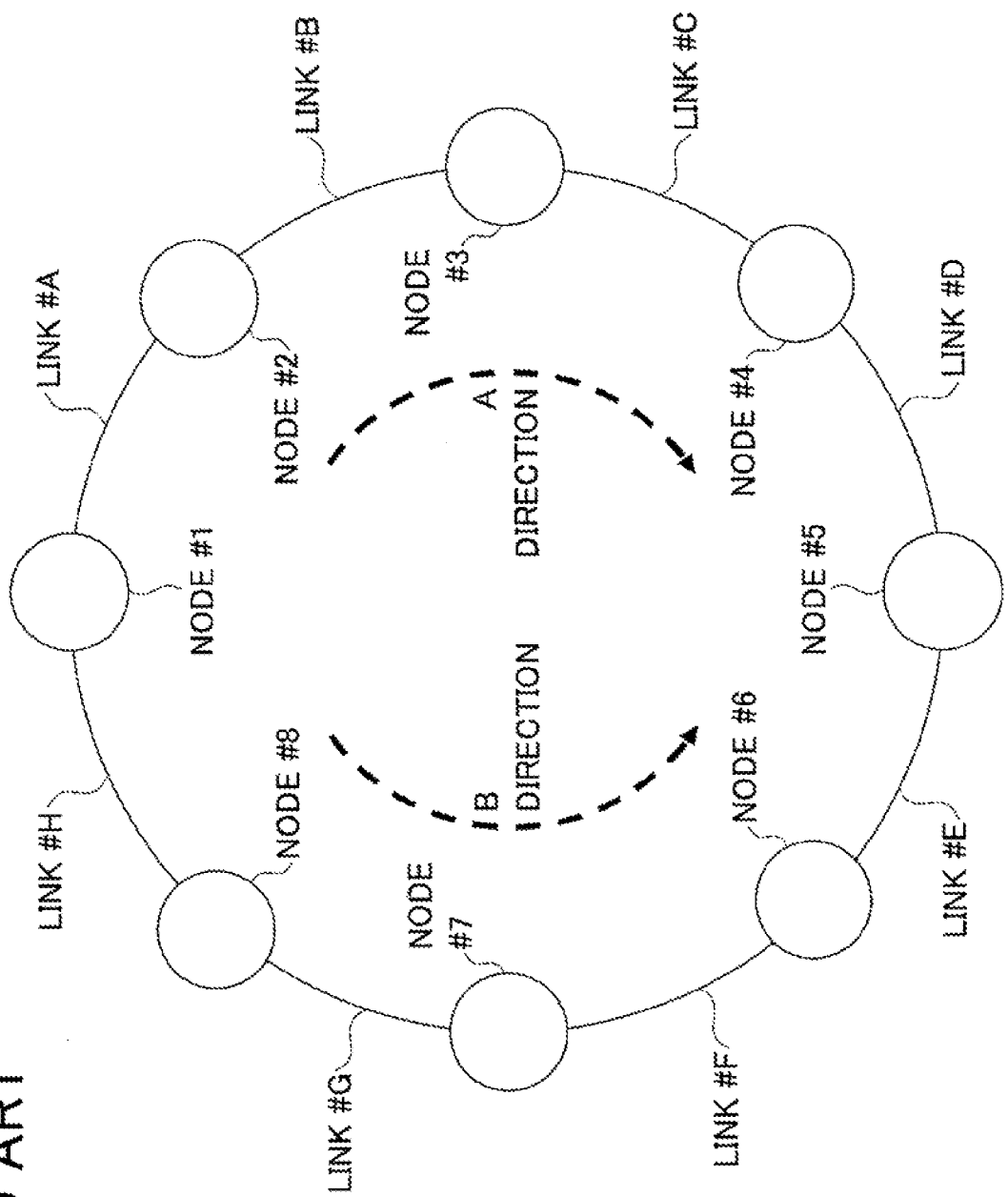
FIG. 1 indicates an example of a ring network.
Figure 2:
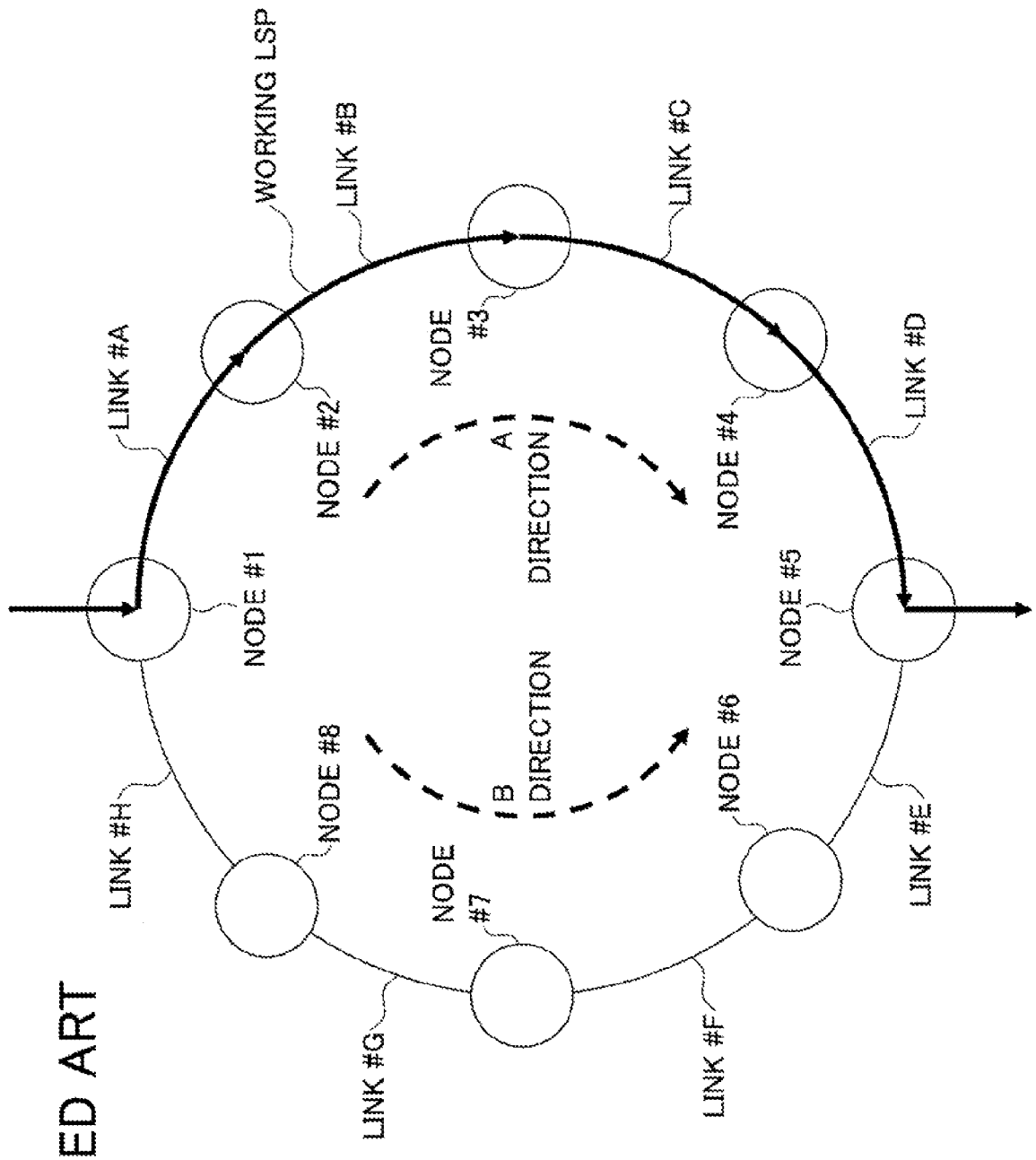
FIG. 2 indicates a state where an LSP is set.
Figure 3:
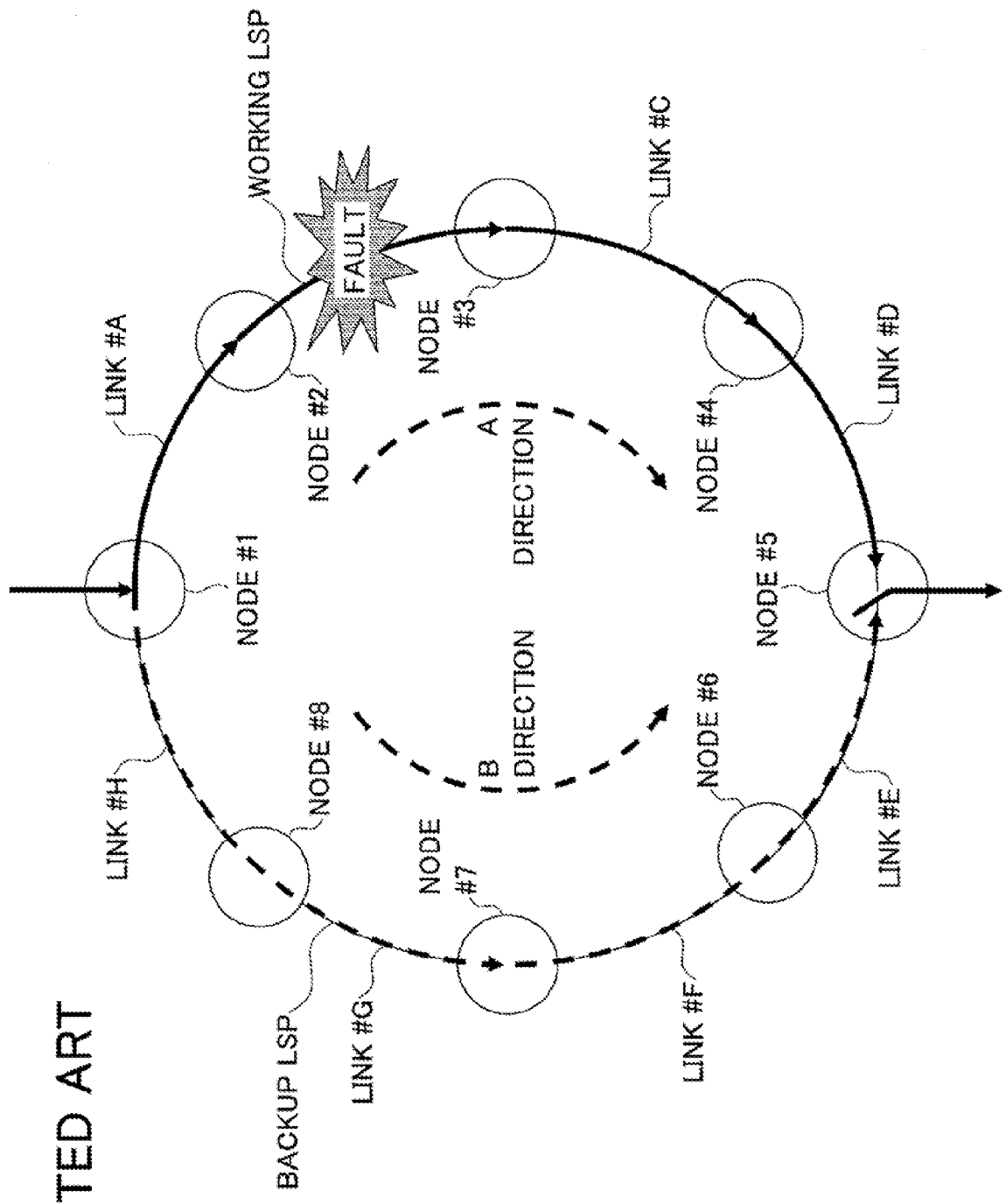
FIG. 3 is for describing a working LSP and a backup LSP.
Figure 4:
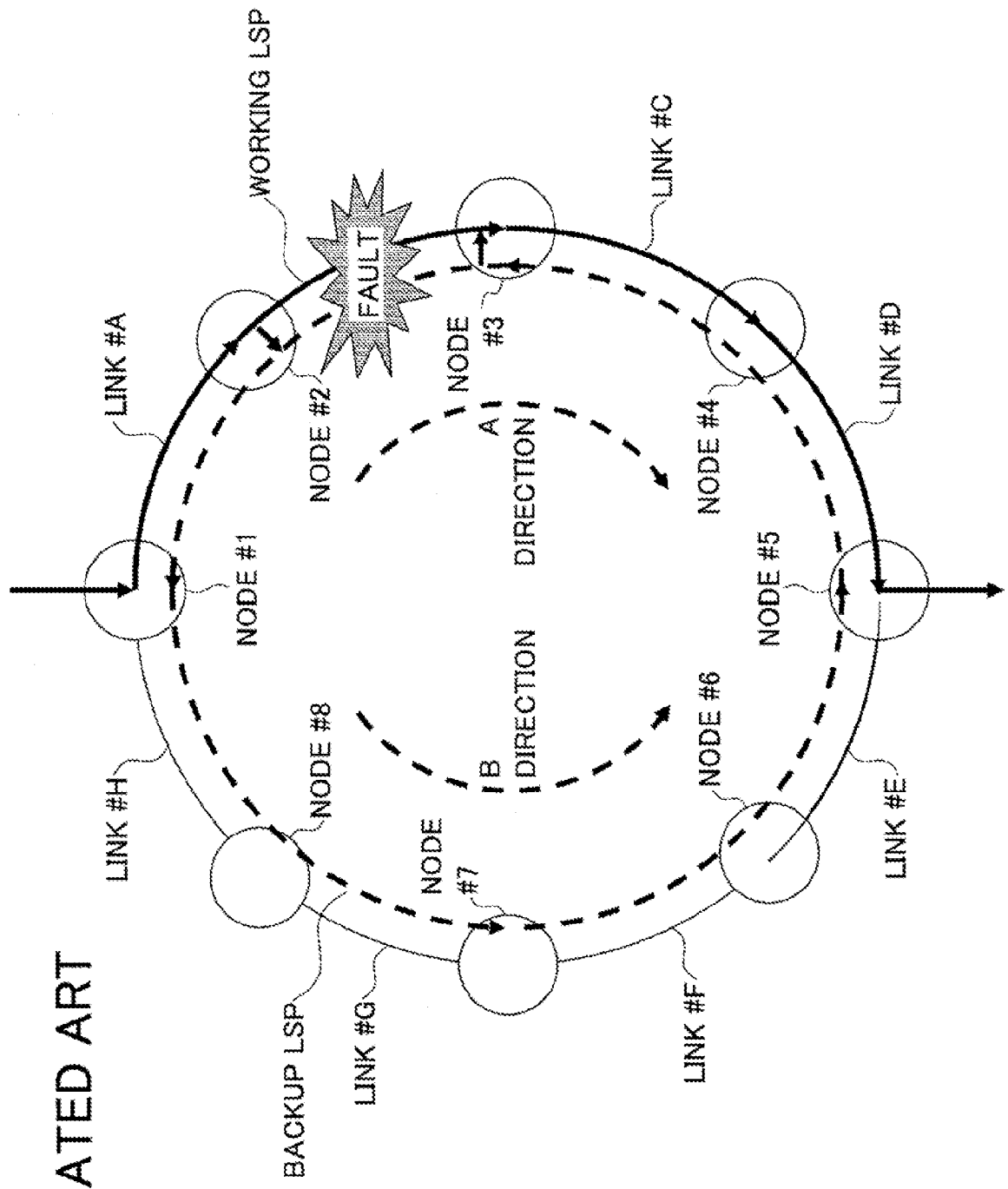
FIG. 4 is for describing a working LSP and a backup LSP.
Figure 5:
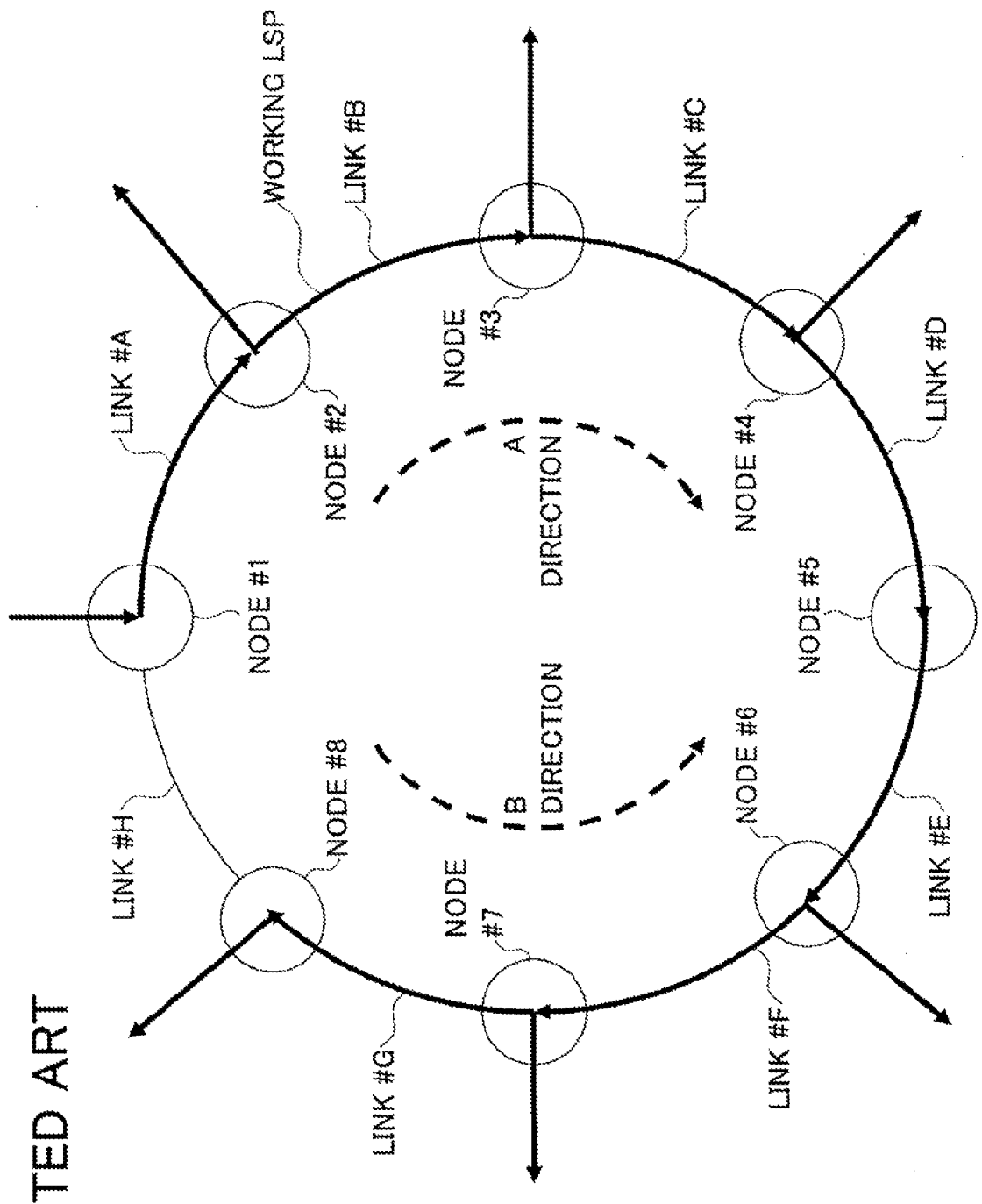
FIG. 5 indicates a configuration of an LSP in conventional multicast communication.
Figure 6:
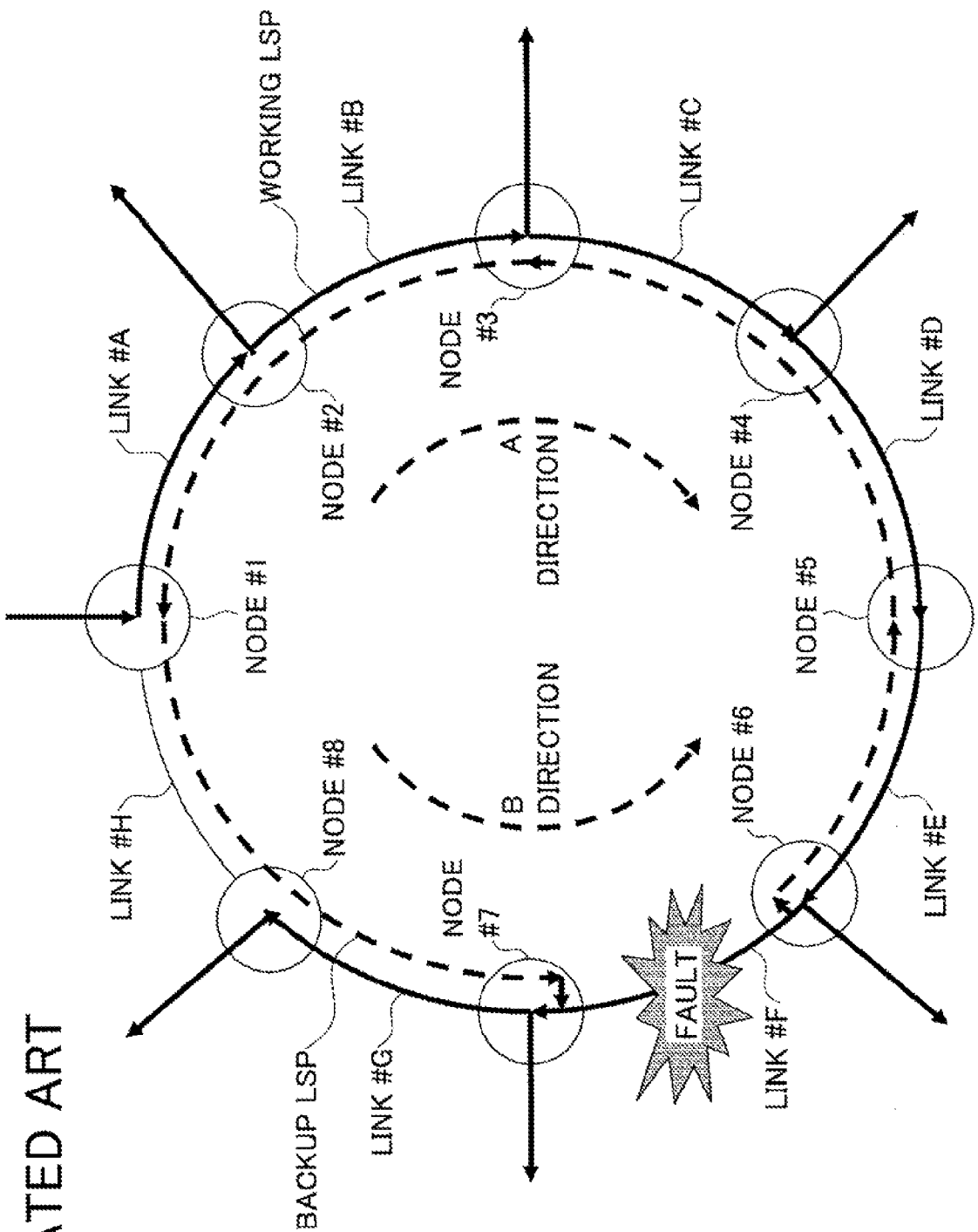
FIG. 6 is for describing a conventional fault recovery method.
Figure 7:
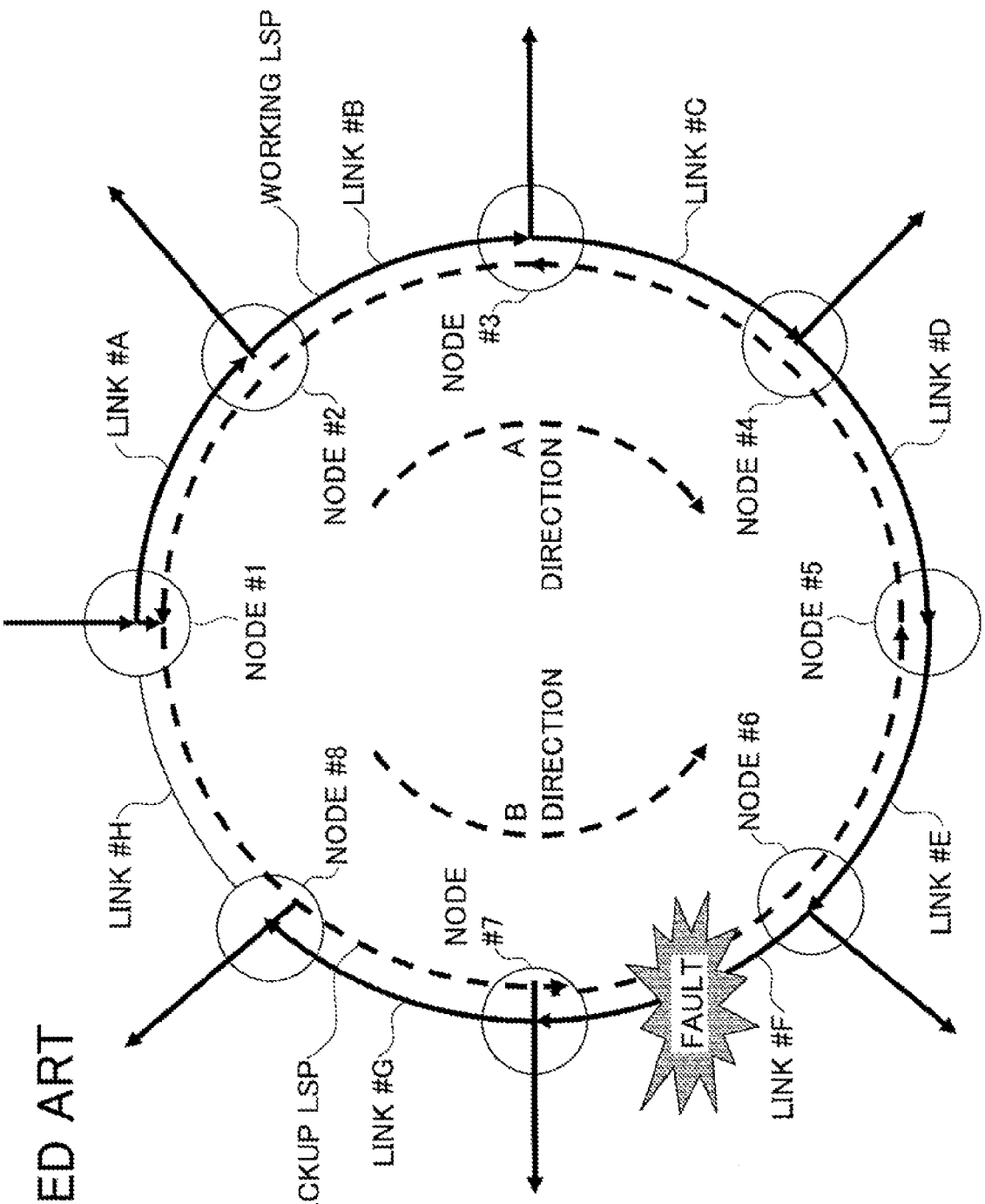
FIG. 7 is for describing a conventional fault recovery method.
Figure 8:
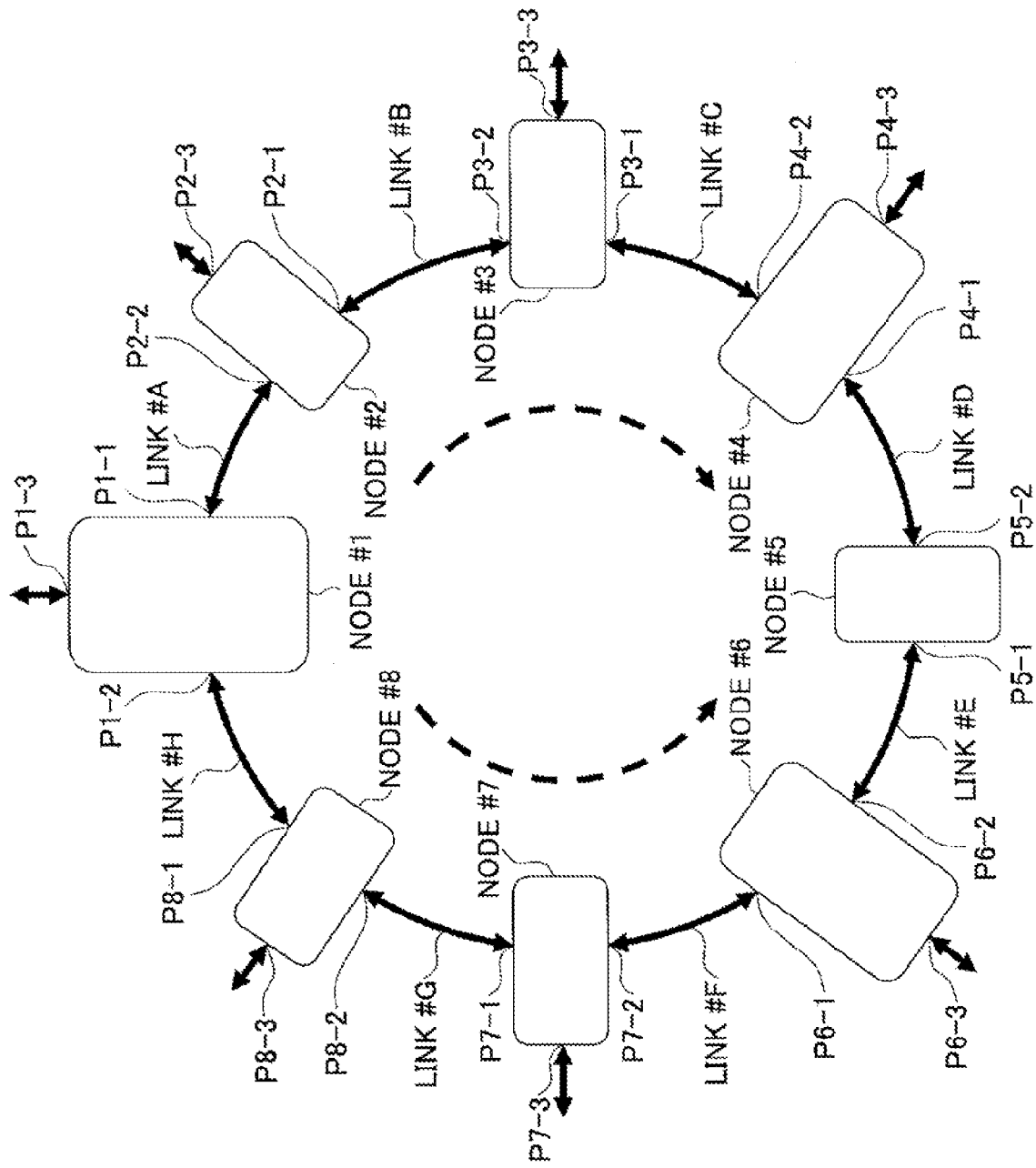
FIG. 8 illustrates a ring network according to a first embodiment.

FIG. 8 illustrates a ring network according to a first embodiment. The ring network of FIG. 8 indicates an LSP configuration in multicast communication. In FIG. 8, the nodes #1 through #8 of the MPLS-TP scheme are connected in a ring shape by links #A through #H to form a ring network. The ports P1-3, P2-3, P3-3, P4-3, P6-3, P7-3, and P8-3 of the respective nodes are client interface ports for input/output to the ring network. The ports P1-1, P2-1, P3-1, P4-1, P5-1, P6-1, P7-1, and P8-1 and the ports P1-2, P2-2, P3-2, P4-2, P5-2, P6-2, P7-2, and P8-2 are network interface ports forming the ring network.

Figure 9:
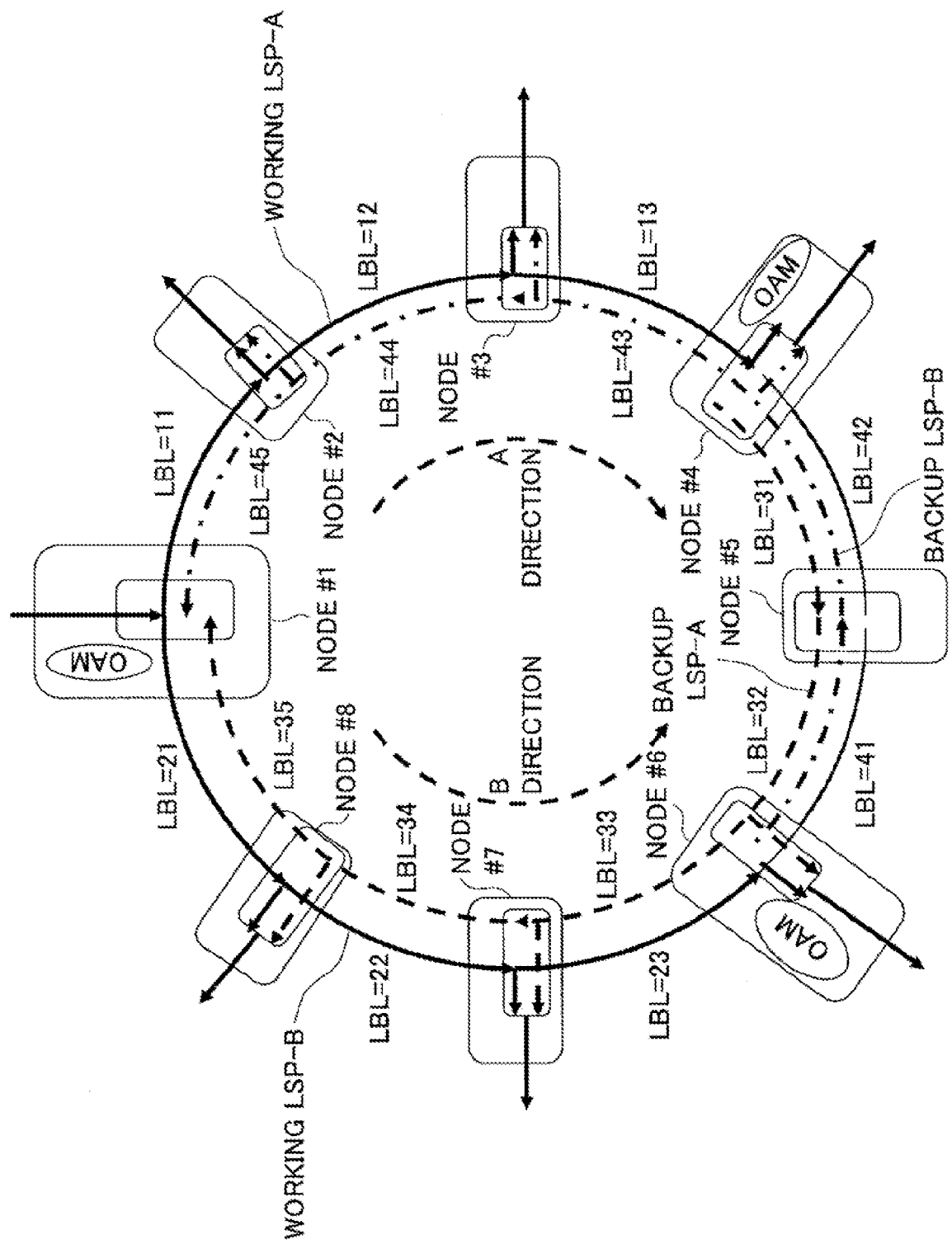
FIG. 9 indicates a multicast LSP scheme in the ring network of FIG. 8.

In the ring network of FIG. 8, a multicast LSP indicated in FIG. 9 is formed. In FIG. 9, signals input from the port P1-3 of node #1 are bridged to two working LSPs, namely a working LSP-A in the A direction (clockwise direction) and a working LSP-B in the B direction (counterclockwise direction). A backup LSP-B (nodes #1, #8, #7, #6, #5, #4) in the B direction (counterclockwise direction) is formed as a backup LSP of the working LSP-A (nodes #1, #2, #3, #4) in the A direction (clockwise direction). That is to say, following the working LSP-A extending from the transmitting node #1 to the receiving node #4 defining the terminal point, there is provided the backup LSP-B connecting the receiving node #4 defining the terminal point through the transmitting node #1 in a ring shape. Among the nodes #1 through #8, at least the transmitting node or the receiving node defining the terminal point of the working LSP has an OAM packet processor (indicated as "OAM" in FIG. 9).

Furthermore, a backup LSP-A (nodes #1, #2, #3, #4, #5, #6) in the A direction is formed as a backup LSP of the working LSP-B (nodes #1, #8, #7, #6) in the B direction. That is to say, following the working LSP-B extending from the transmitting node #1 to the receiving node #6 defining the terminal point, there is provided the backup LSP-A connecting the receiving node #6 defining the terminal point through the transmitting node #1 in a ring shape.

The node #1 that is a transmitting node has a function of inserting OAM packets in the working LSP-A in the A direction and the working LSP-B in the B direction, and a function of receiving OAM packets from the backup LSP-A in the A direction and the backup LSP-B in the B direction.

The OAM packet processor in the node #1 that is a transmitting node has the following functions. One function is for periodically transmitting OAM packets of CCM (Continuity Check Message) for connection confirmation to the OAM packet processor in the node #4 defining the terminal point that is far away from the transmitting node of the working LSP-A in the A direction. Another function is for periodically transmitting OAM packets of CCM to the OAM packet processor in the node #6 defining the terminal point that is far away from the transmitting node of the working LSP-B in the B direction. Yet another function is for transmitting an OAM packet of a switch request (THR-RQ) instructing the OAM packet processor in the node #6 defining the terminal point of the working LSP-B in the B direction to connect the working path to the backup path, when an OAM packet of a fault report (LOC-F) for reporting that a fault state has occurred (LOC: Loss of Continuity) is received via the backup LSP-A in the A direction from the OAM packet processor in the node #4 defining the terminal point of the working LSP-A in the A direction. Yet another function is for transmitting an OAM packet of a switch request to the OAM packet processor in the node #4 defining the terminal point of the working LSP-A in the A direction, when an OAM packet of a LOC fault report is received via the backup LSP in the B direction from the OAM packet processor in the node #6 defining the terminal point of the working LSP-B in the B direction.

Furthermore, the receiving nodes #2, 3, and 4 have a function of dropping (extracting) signals from both the working LSP-A and the backup LSP-B, and the receiving nodes #6, 7, and 8 have a function of dropping signals from both the working LSP-B and the backup LSP-A.

The node #4 defining the terminal point of the working LSP-A among the receiving nodes has a function of connecting the working LSP-A to the backup LSP-A, a function of receiving OAM packets from the working LSP-A and inserting the received OAM packets in the backup LSP-A, and a function of connecting from the working LSP-A to the backup LSP-A according to instructions from the OAM packet processor in itself.

The OAM packet processor in the node #4 defining the terminal point of the working LSP-A in the A direction has the following functions. One function is for monitoring reception of OAM packets in the working LSP-A, and detecting a fault state (LOC) when OAM packets are not received for a predetermined period. Another function is for transmitting OAM packets of LOC occurrence reports onto the backup LSP-A in the A direction to the OAM packet processor in the transmitting node #1, when LOC is detected in the working LSP-A. Yet another function is for giving an instruction to connect the working LSP-A in the A direction with the backup LSP-A in the A direction in itself, when an OAM packet of a switching request is received from the OAM packet processor in the transmitting node #1 in the working LSP-A.

Among the receiving nodes, the node #6 defining the terminal point of the working LSP-B has the following functions. One function is for connecting from the working LSP-B to the backup LSP-B. Another function is for receiving an OAM packet from the working LSP-B and inserting the OAM packet in the backup LSP-B. Yet another function is for connecting from the working LSP-B to the backup LSP-B, according to the OAM packet processor in itself.

The OAM packet processor in the node #6 defining the terminal point of the working LSP-B in the B direction has the following functions. One function is for monitoring reception of OAM packets of the working LSP-B, and detecting a fault state when OAM packets are not received for a predetermined period. Another function is for transmitting OAM packets of LOC occurrence reports onto the backup LSP-B in the B direction to the OAM packet processor in the transmitting node #1, when LOC is detected in the working LSP-B. Yet another function is for giving an instruction to connect the working LSP-B in the B direction with the backup LSP-B in the B direction in itself, when an OAM packet of a switching request is received from the OAM packet processor in the transmitting node #1 in the working LSP-B.

Hardware Configuration of Node Device

Figure 10:
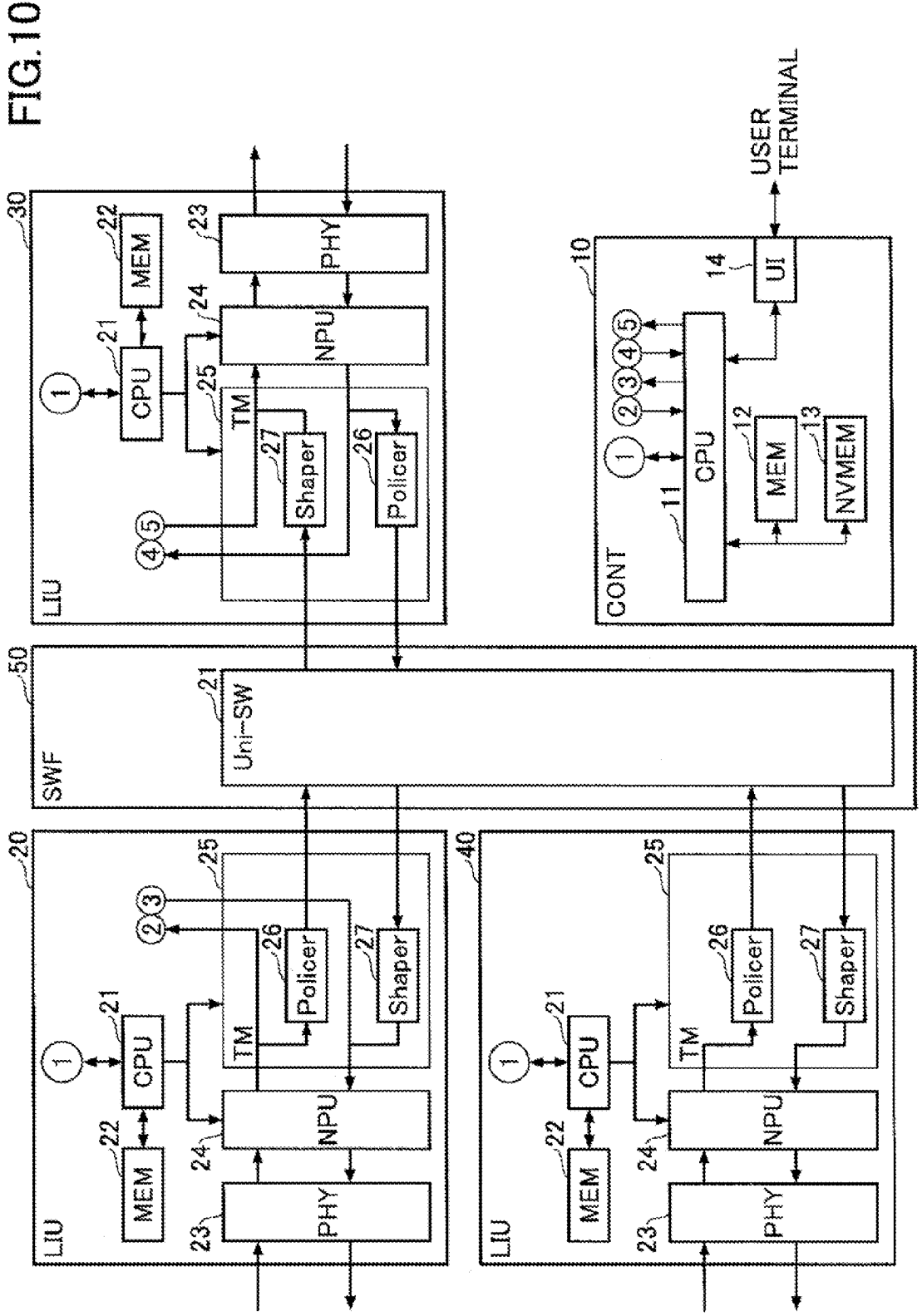
FIG. 10 is a hardware block diagram of a node device according to an embodiment.

FIG. 10 is a hardware block diagram of a node device according to an embodiment. The node device in FIG. 10 corresponds to the nodes #1 through #8 of the MPLS-TP scheme. In FIG. 10, a controller (CONT) 10 is for setting and controlling the entire device, and includes a CPU 11 and memories 12 and 13. The memories include a volatile memory (MEM) 12 for processing, and a non-volatile memory (NVMEM) 13 for holding setup data. The CPU 11 executes a setting process and a control process by executing programs read from the memories 12 and 13. A user terminal is connected to a user interface (UI) 14 when a maintenance person sets the node device.

Furthermore, the memory 13 holds LSP management information used for routing. The LSP management information includes, for each node, an LSP management number, an input LIU number, an input label, an output 1-LIU number, an output 1-label, an output 2-LIU number, and an output 2-label.

The CPU 11 of the controller 10 includes interfaces for the respective CPUs 21 included in link interface units (LIU) 20, 30, and 40, and reports LSP management information to the link interface units 20, 30, and 40. The controller 10 includes an OAM packet interface function for the link interface unit 20 and the link interface unit 30, and an OAM packet processing function, and monitors OAM packets, generates OAM packets, and gives switching instructions of routing to the link interface units.

The link interface units 20 and 30 are for providing network interfaces, and the link interface unit 40 is for providing a client interface. Each of the link interface units includes a CPU 21, a volatile memory (MEM) 22, a physical layer terminal part (PHY) 23, a network processing unit (NPU) 24, and a traffic manager (TM) 25.

The CPU 21 holds LSP management information reported from the controller 10 in the volatile memory (MEM) 22, sets the LSP management information in the NPU 24, and makes settings for policing and shaping of a policer 26 and a shaper 27 of the TM 25. Furthermore, the CPU 21 changes the routing by updating the LSP management information of the NPU 24 in accordance with routing switch instructions from the controller 10.

The physical layer terminal part 23 is a signal interface for networks and client transmission paths. The NPU 24 is a processor and supplements the CPU 21.

The receiving side process of the NPU 24 involves checking the LSF #1 label value of a received packet, attaching, to the packet, an in-device header including information such as an LSP management number, an input LIU number, an output 1-LIU number, and an output 2-LIU number corresponding to the label value, and transferring the packet to the TM 25. Furthermore, in a node including an OAM packet processor, when the label value of LSF #2 of the input packet indicates an OAM packet, a value indicating the controller 10 is set as the output LIU number, and the signal is transmitted to the TM 25. The transmitting side process of the NPU 24 involves removing the in-device header from the transmission packets received from the TM 25 and the controller 10, changing the LSF #1 label value to an output label value according to the LSP management number in the in-device header, and transmitting the packets to the physical layer terminal part 23.

The receiving side process of the TM 25 involves policing a received packet (limiting the rate of the received packet) and transferring the received packet to a switch fabric (SWF) 50. When the output LIU number in the in-device header of the received packet is a value indicating the controller 10, the received packet is transferred to the controller 10. The transmitting side process of the TM 25 involves shaping (limiting the rate of the transmission packet) the packet input from the switch fabric 50, and transferring the transmission packet to the NPU 24. Furthermore, the OAM packet received from the controller 10 is transferred to the NPU 24.

The configuration of the link interface unit 40 is the same as that of the link interface units 20 and 30; however, an OAM packet process is not performed at a client interface, and therefore the link interface unit 40 does not have a function of an OAM packet process. The receiving side process of the link interface unit 40 involves attaching an MPLS-TP label header and an in-device header to a received packet and transferring the packet to the TM 25. The transmitting side process involves removing the in-device header and the MPLS-TP label header from the transmission packet received from the TM 25, and transmitting the packet to the physical layer terminal part 23.

The switch fabric 50 transfers the packet to the link interface unit (LIU) on the output side, according to the output 1-LIU number/output 2-LIU number in the in-device header of the input packet. When LIU numbers are set in both the output 1-LIU number and the output 2-LIU number of the in-device header, the switch fabric 50 creates a copy of the input packet and transfers the packets to the link interface units indicated by both LIU numbers.

Functional Block Diagram of Node Device

Figure 11:
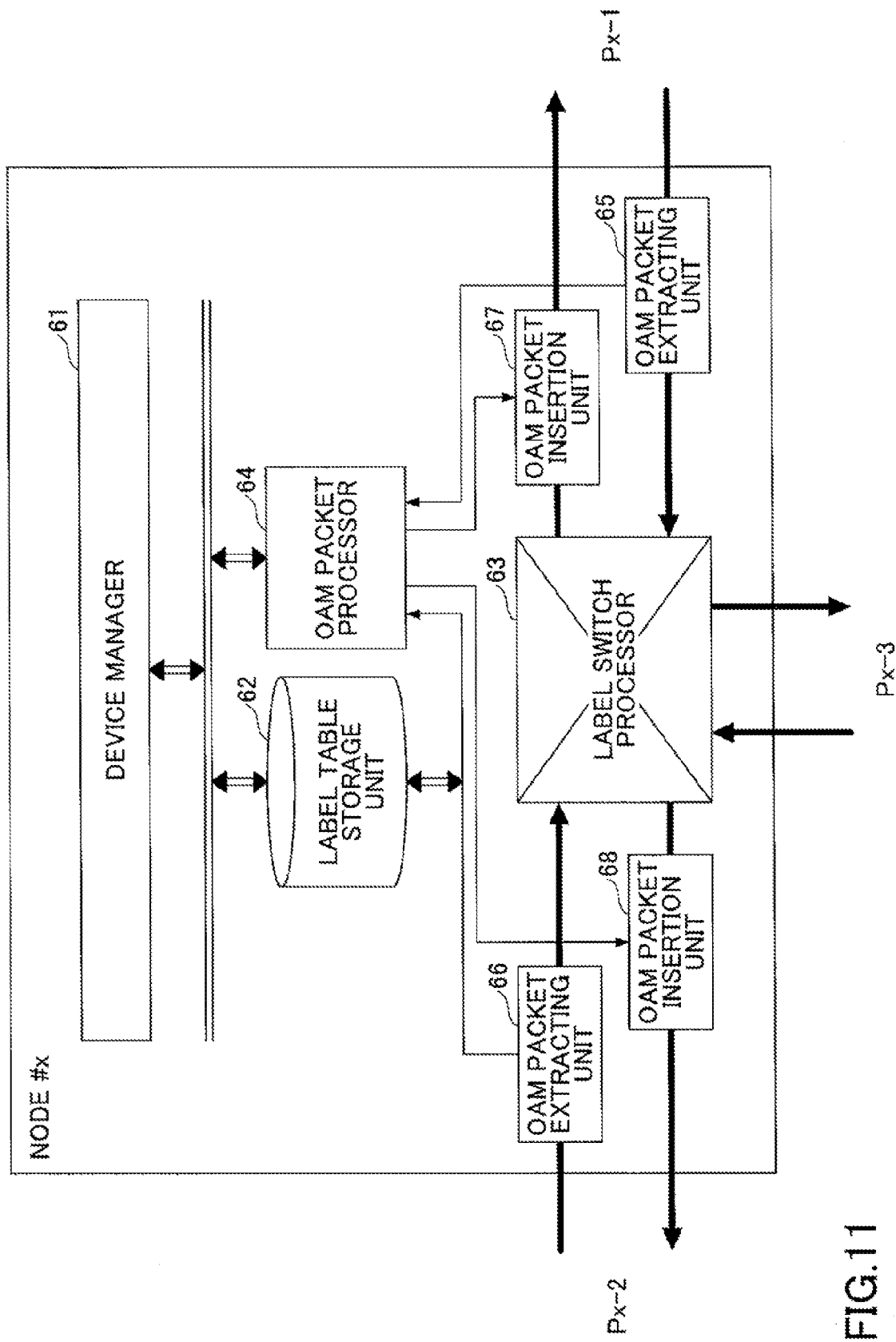
FIG. 11 is a functional block diagram of the node device according to an embodiment.

FIG. 11 is a functional block diagram of the node device according to an embodiment. In FIG. 11, a device manager 61 is a functional unit for generating user interfaces and LSP management information for device settings. The LSP management information that is routing information created by the device manager 61 is stored in a label table storage unit 62. The routing information of the label table storage unit 62 is supplied for instructing routing to a label switch processor 63. Furthermore, the routing settings are switched for the label switch processor 63 according to instructions from an OAM packet processor 64.

The label switch processor 63 implements routing of signals according to routing information instructed from the label table storage unit 62. Furthermore, if the signals are to be bridged into two directions, the label switch processor 63 copies the signals, and then transmits the signals into the two directions.

The OAM packet processor 64 is supplied with OAM packets extracted at OAM packet extracting units 65 and 66 from reception signals from a port Px-1 (x=1, 2, 3, 4, 5, 6, 7, 8) or a port Px-2, and monitors reception of OAM packets. Furthermore, the OAM packet processor 64 supplies the generated OAM packets to OAM packet insertion units 67 and 68 to insert the packets in transmission signals, and transmits the transmission signals from a port Px-1 or a port Px-2.

The above device manager 61 and the OAM packet processor 64 are implemented at the controller 10, the label table storage unit 62 is implemented at the non-volatile memory 13 of the controller 10 and the volatile memory (MEM) 22 of the link interface units 20 and 30, and the label switch processor 63 is implemented at the NPU 24 of the link interface units 20 and 30 and the switch fabric 50.

LSP Management Information, in-Device Header, OAM Packet

FIG. 12 indicates LSP management information stored in the label table storage unit 62 of each node according to the first embodiment. The LSP management information includes, for each node, an LSP management number, an input LIU number, an input label (LBL), an output 1-LIU number, an output 1-label (LBL), an output 2-LIU number, and an output 2-label (LBL). These information items are provided for a normal state, a fault state of a working LSP in the A direction, and a fault state of a working LSP in the B direction. In FIG. 12, the LSP management information items for nodes #1 through #8 are described; however, the label table storage unit 62 of each node may only store the LSP management information of its own node.

The information indicates that a signal, which has a label value indicated by the input LBL of a client interface port or a network interface port indicated in the input LIU number, is to be routed as a packet having a label value indicated by an output LBL of a client interface port or a network interface port indicated in the output LIU. The information indicates that when there are two output LIUs set for one input, the input signals are to be bridged to two output LIUs. For example, at the node #1, a label (LBL)=11 is assigned to an input signal at the port P1-3 and the signal is output from the port P1-1, and a label (LBL)=21 is assigned to the input signal and the signal is output from the port P1-2.

At the node #4 defining the terminal point of the working LSP, when an OAM packet of a switch request (THR-RQ) is received, the routing of the OAM packet processor 64 is changed to an input LIU number, an input label, an output 1-LIU number, an output 1-label, an output 2-LIU number, and an output 2-label of a fault state of the working LSP in the B direction. Accordingly, signals of the working LSP are connected to the backup LSP. Similarly, at the node #6 defining the terminal point of the working LSP, when an OAM packet of a switch request (THR-RQ) is received, the routing of the OAM packet processor 64 is changed to an input LIU number, an input label, an output 1-LIU number, an output 1-label, an output 2-LIU number, and an output 2-label of a fault state of a working LSP in the A direction. Accordingly, signals of the working LSP are connected to the backup LSP.

FIG. 13 indicates an in-device header according to an embodiment. The in-device header includes an LSP management number, an input LIU number, an output 1-LUI number, and an output 2-LUI number.

Figure 14:
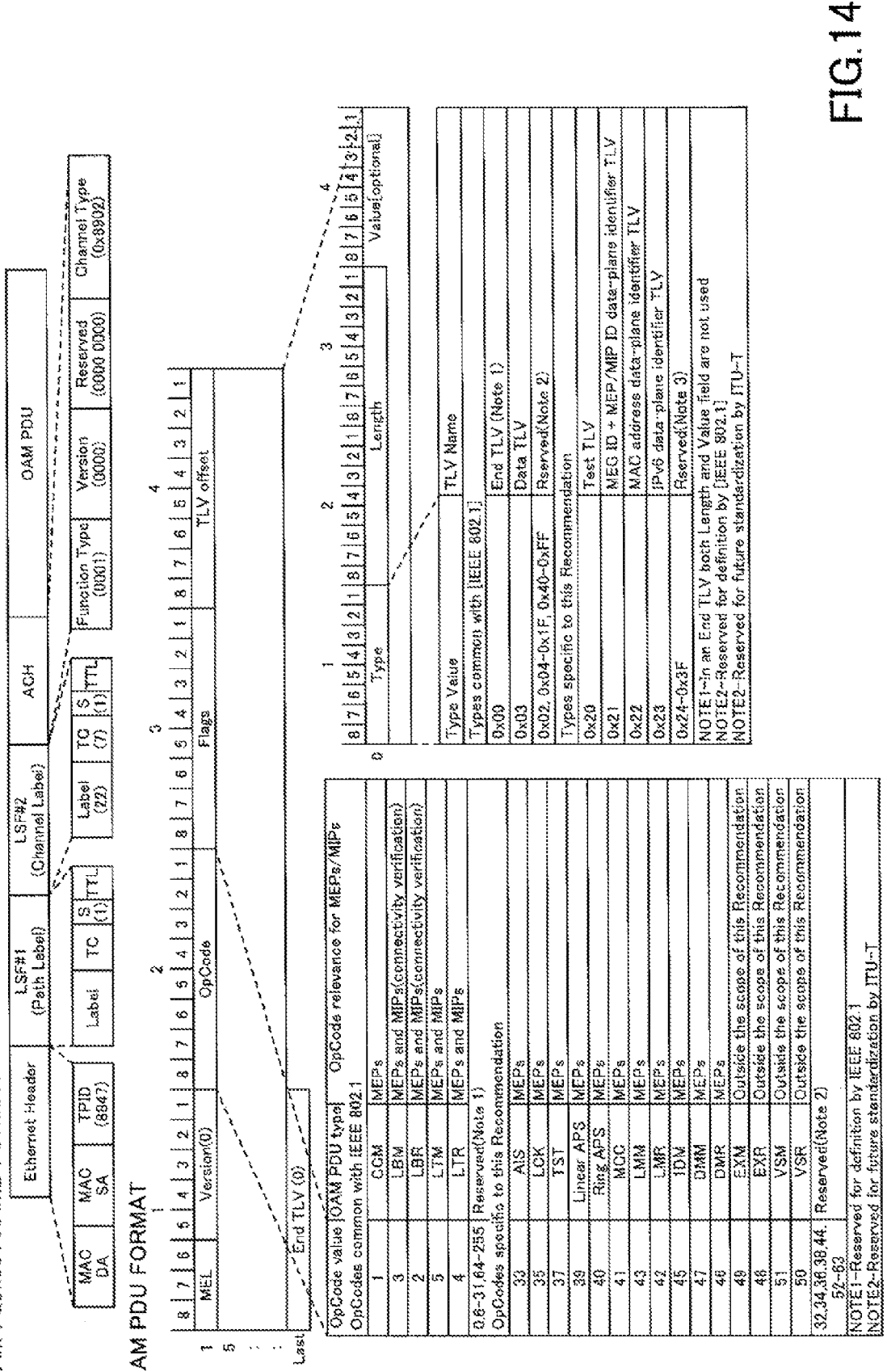
FIG. 14 indicates a frame format of an OAM packet.

FIG. 14 indicates a frame format of an OAM packet. This frame format includes fields of a Destination MAC Address, a Source MAC Address, and a TPID (Type ID), followed by various information fields including LSF#1 used for routing, LSF#2 used for distinguishing between signals and OAM packets, an ACH (Associated Channel Header), and an OAM PDU (Payload Data Unit).

The OAM PDU includes MEL (MEG (Maintenance Entity Group) Level) that is OAM level information, OpCode indicating the type of OAM PDU, Flags used for purposes determined according to the type, and TLV offset indicating the position of the first TLV in the OAM PDU. When OpCode is 1, it is indicated that the type of the OAM PDU is CCM. OpCodes 52 through 63 are not used, and for example, OpCode=52 is assigned to a LOC occurrence report (LOC-F) and OpCode=53 is assigned to a switch request (THR-RQ). Furthermore, for example, OpCode=54 is assigned to a switch request (SW-RQ) described below.

Flowchart

Figure 15A:
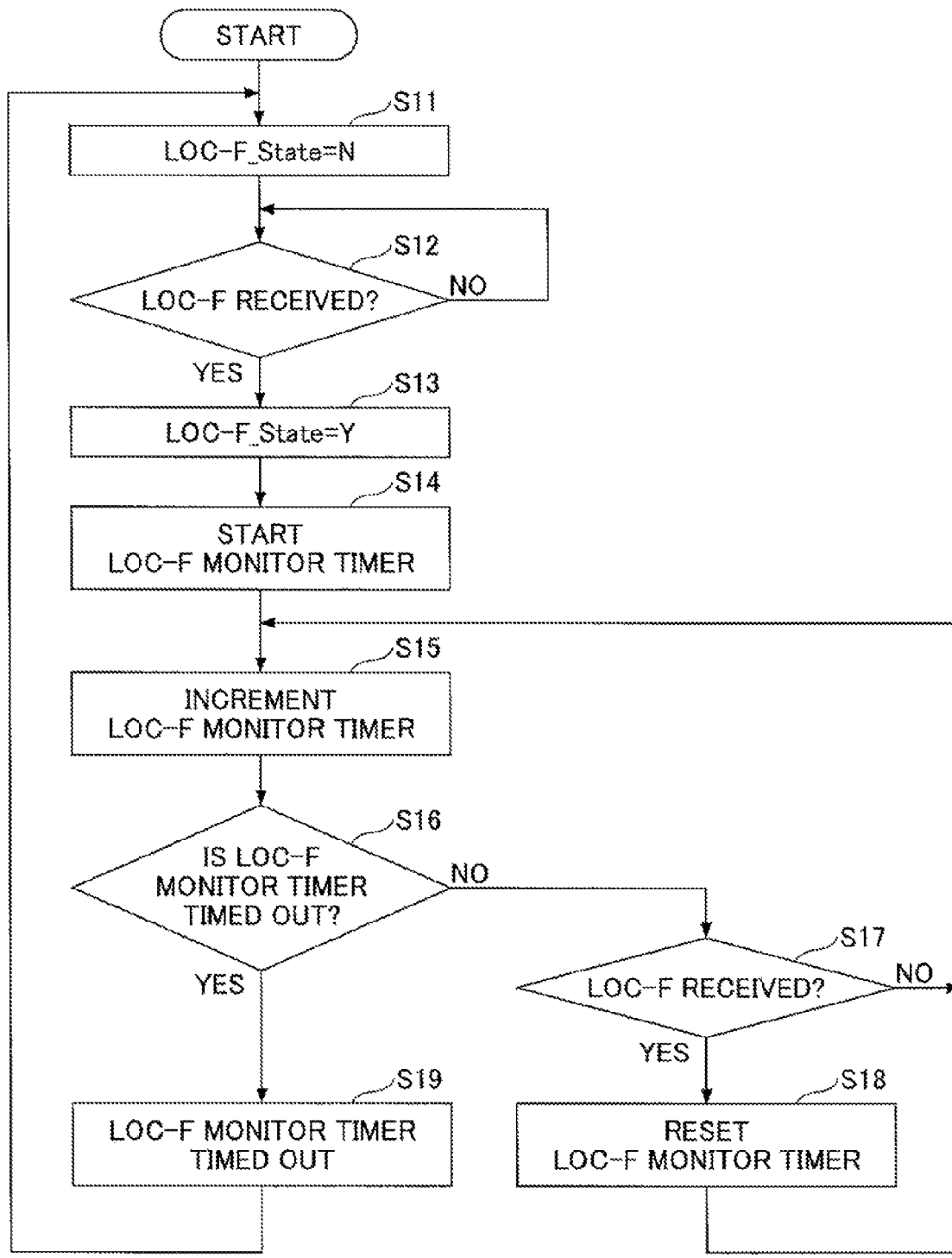
FIG. 15A is a flowchart of an OAM packet receiving process executed by a transmitting node.
Figure 15B:
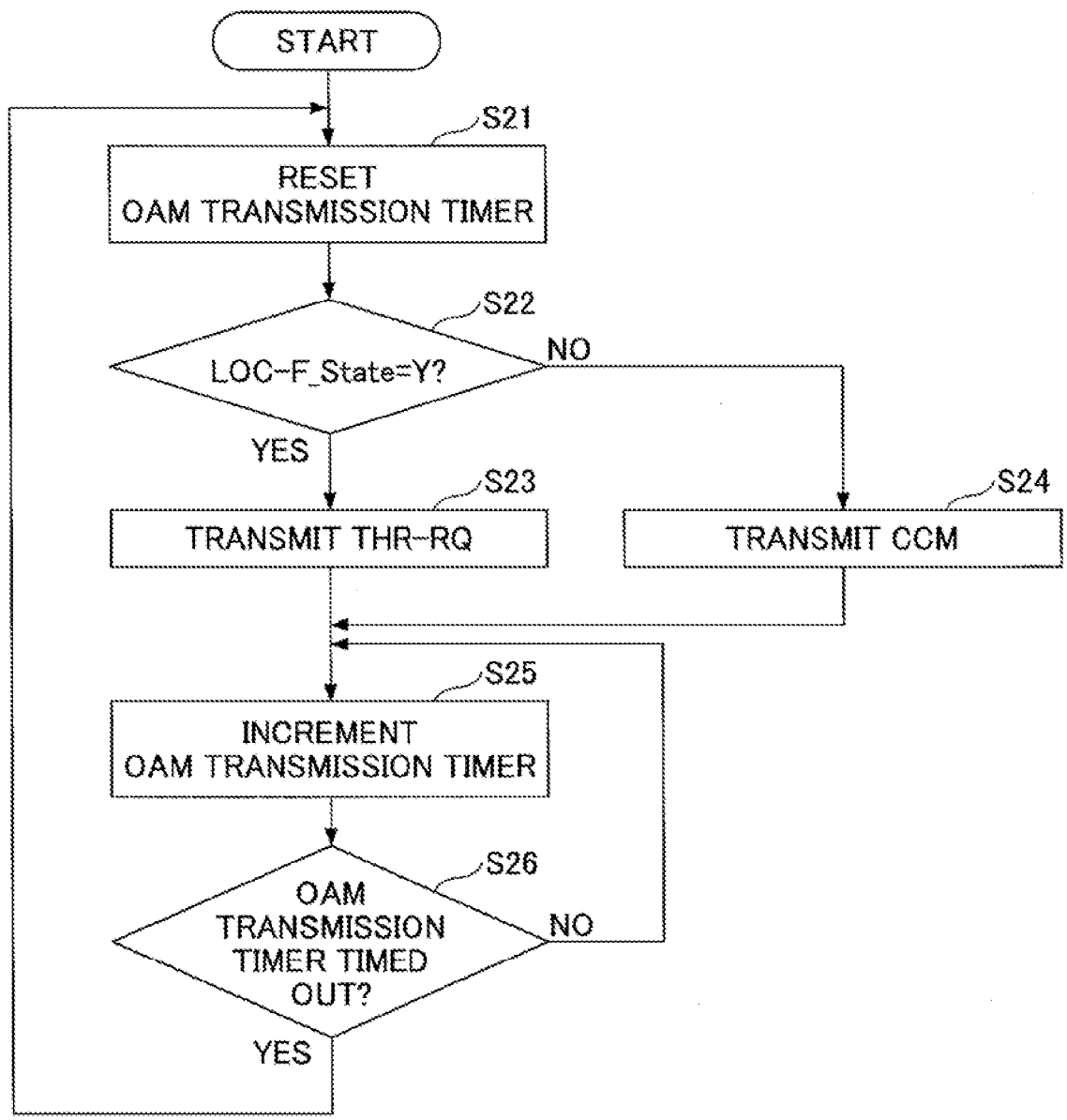
FIG. 15B is a flowchart of an OAM packet transmitting process executed by a transmitting node.

FIGS. 15A and 15B are flowcharts of an OAM packet receiving process and an OAM packet transmitting process in one direction (A direction or B direction) executed by the OAM packet processor 64 in the transmitting node (node #1).

In FIG. 15A, in step S11, N is set in LOC-F_State and a report is sent to the OAM packet transmitting process. In step S12, it is determined whether an OAM packet of a LOC occurrence report (LOC-F) has been received, and when LOC-F has been received, the process proceeds to step S13. In step S13, Y is set in LOC-F_State and a report is sent to the OAM packet transmitting process. In step S14, a LOC-F monitor timer is started.

Next, in step S15, the LOC-F monitor timer is incremented, and in step S16, it is determined whether the LOC-F monitor timer is timed out. For example, the LOC-F monitor timer becomes timed out in several tens of msec. If the LOC-F monitor timer is not timed out, in step S17, it is determined whether an OAM packet of LOC-F has been received.

When LOC-F has been received, in step S18, the LOC-F monitor timer is reset and the process returns to step S15. When LOC-F has not been received, the process returns to step S15 without resetting the timer. Meanwhile, in step S16, when the LOC-F monitor timer is timed out, in step S19, the LOC-F monitor timer is stopped, and the process returns to step S11.

In FIG. 15B, in step S21, an OAM transmission timer is reset. In step S22, it is determined whether LOC-F_State=Y. If the determination result is LOC-F_State=Y in step S22, in step S23, an OAM packet of a switch request (THR-RQ) is transmitted. If the determination result is LOC-F_State=N in step S22, in step S24, an OAM packet of CCM for monitoring is transmitted.

Next, in step S25, the OAM transmission timer is incremented, and in step S26, it is determined whether the OAM transmission timer is timed out. The OAM transmission timer becomes timed out in, for example, several msec through several tens of msec. If the OAM transmission timer is not timed out, the process returns to step S25, and if the OAM transmission timer is timed out, the process returns to step S21.

Figure 16A:
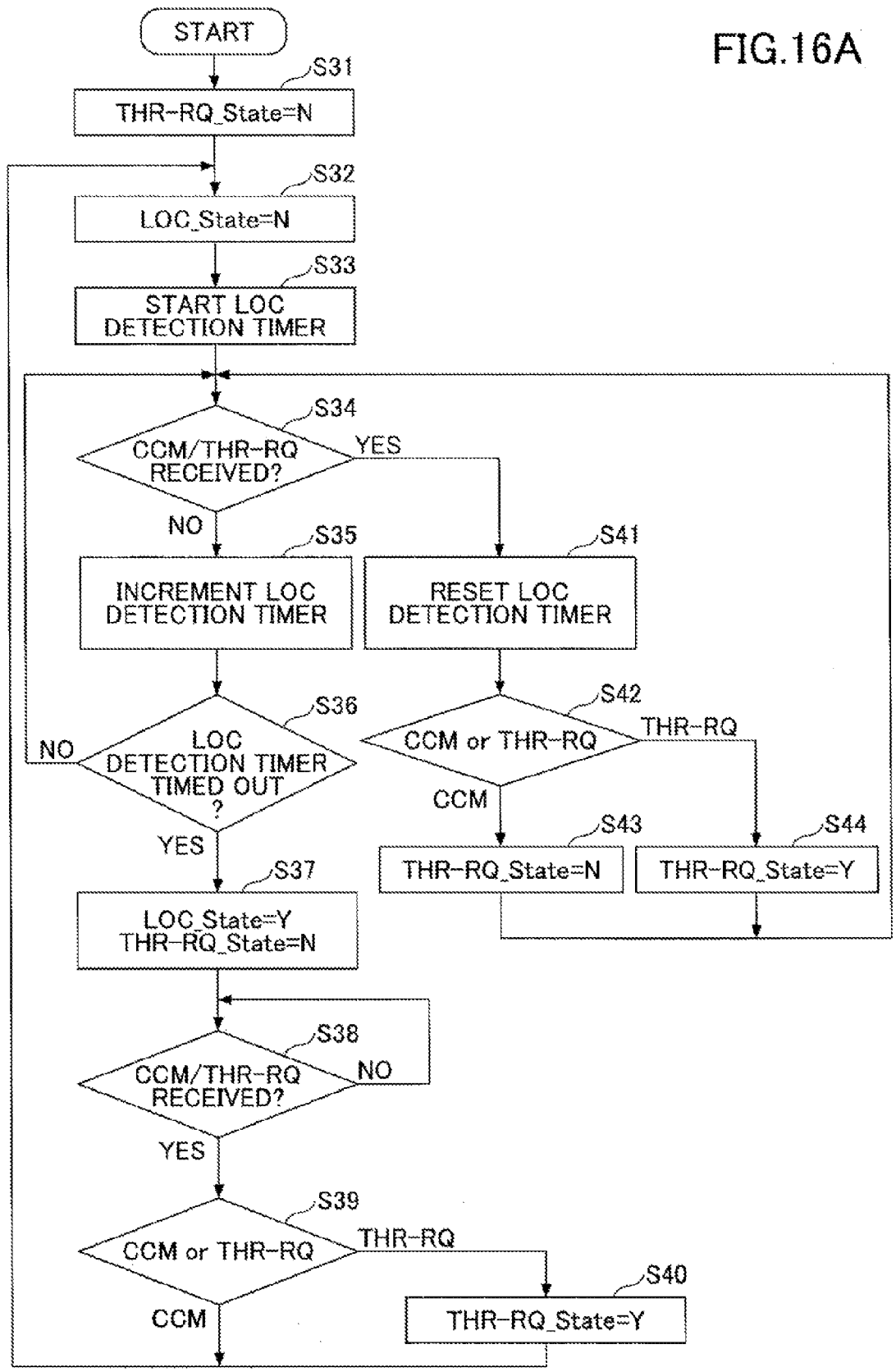
FIG. 16A is a flowchart of an OAM packet receiving process executed by a node defining a terminal point of a working LSP.
Figure 16B:
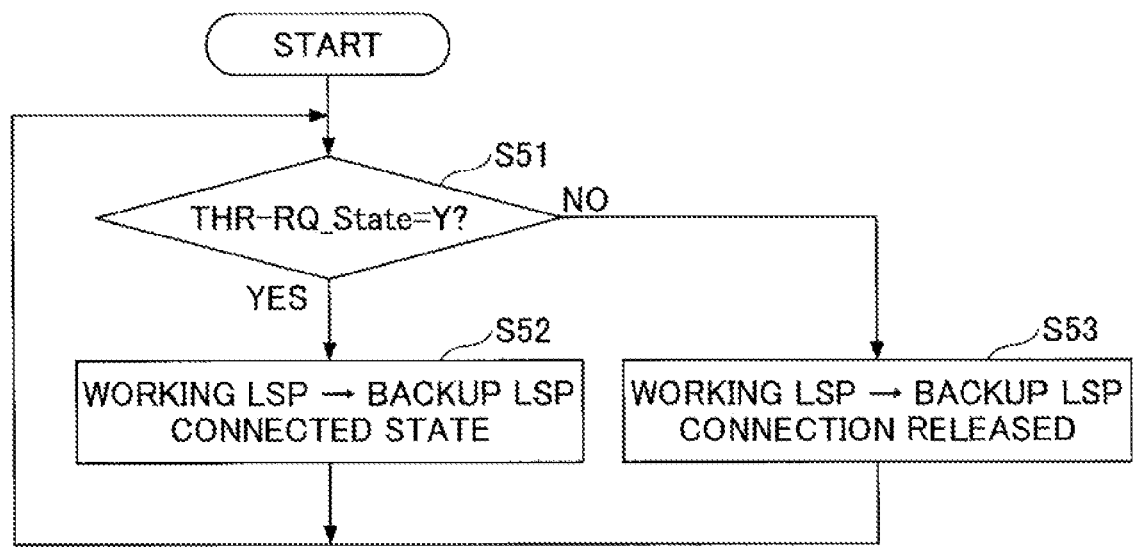
FIG. 16B is a flowchart of a switch instruction process executed by a node defining a terminal point of a working LSP.

FIGS. 16A, 16B, and 16C are flowcharts of an OAM packet receiving process, a switch instruction process, and an OAM packet transmitting process executed by the OAM packet processor 64 in the nodes #4 and #6 defining terminal points of the working LSP.

In FIG. 16A, in step S31, N is set in THR-RQ_State and a report is sent to the OAM packet transmitting process. In step S32, N is set in LOC_State and a report is sent to the switch instruction process. In step S33, the LOC detection timer is started.

Next, in step S34, it is determined whether an OAM packet of CCM or THR-RQ is received. When an OAM packet of CCM or THR-RQ is not received, in step S35, the LOC detection timer is incremented, and in step S36, it is determined whether the LOC detection timer is timed out. For example, the LOC detection timer becomes timed out in several tens of msec. If the LOC detection timer is not timed out, the process returns to step S34, and if the LOC detection timer is timed out, the process proceeds to step S37.

In step S37, Y is set in LOC_State and a report is sent to the OAM packet transmitting process, and N is set in THR-RQ_State and a report is sent to the switch instruction process. Next, in step S38, it is determined whether an OAM packet of CCM or THR-RQ is received. When an OAM packet of CCM or THR-RQ is received, in step S39, it is determined whether the OAM packet is of CCM or THR-RQ. When the OAM packet is of CCM, the process returns to step S32. When the OAM packet is of THR-RQ, in step S40, Y is set in THR-RQ_State and a report is sent to the switch instruction process, and the process returns to step S32.

Meanwhile, when an OAM packet of CCM or THR-RQ is received at step S34, in step S41, the LOC detection timer is reset. Next, in step S42, it is determined whether the OAM packet is of CCM or THR-RQ. When the OAM packet is of CCM, in step S43, N is set in THR-RQ_State. When the OAM packet is of THR-RQ, in step S44, Y is set in THR-RQ_State and a report is sent to the switch instruction process, and the process returns to step S34.

In FIG. 16B, in step S51, it is determined whether THR-RQ_State=Y. When it is determined that THR-RQ_State=Y, in step S52, an instruction is given to change routing so that the working LSP is connected to the backup LSP. When it is determined that THR-RQ_State=N, in step S53, an instruction is given to change routing so that the working LSP is disconnected from the backup LSP.

In FIG. 16C, in step S61, the OAM transmission timer is reset. In step S62, it is determined whether LOC_State=Y. If the determination result is LOC_State=Y in step S62, in step S63, an OAM packet of a LOC occurrence report (LOC-F) is transmitted. Next, in step S64, the OAM transmission timer is incremented, and in step S65, it is determined whether the OAM transmission timer is timed out. The OAM transmission timer becomes timed out in, for example, several msec through several tens of msec. If the OAM transmission timer is not timed out, the process returns to step S64, and if the OAM transmission timer is timed out, the process returns to step S61.

Description of Fault Recovery Operation

Figure 17:
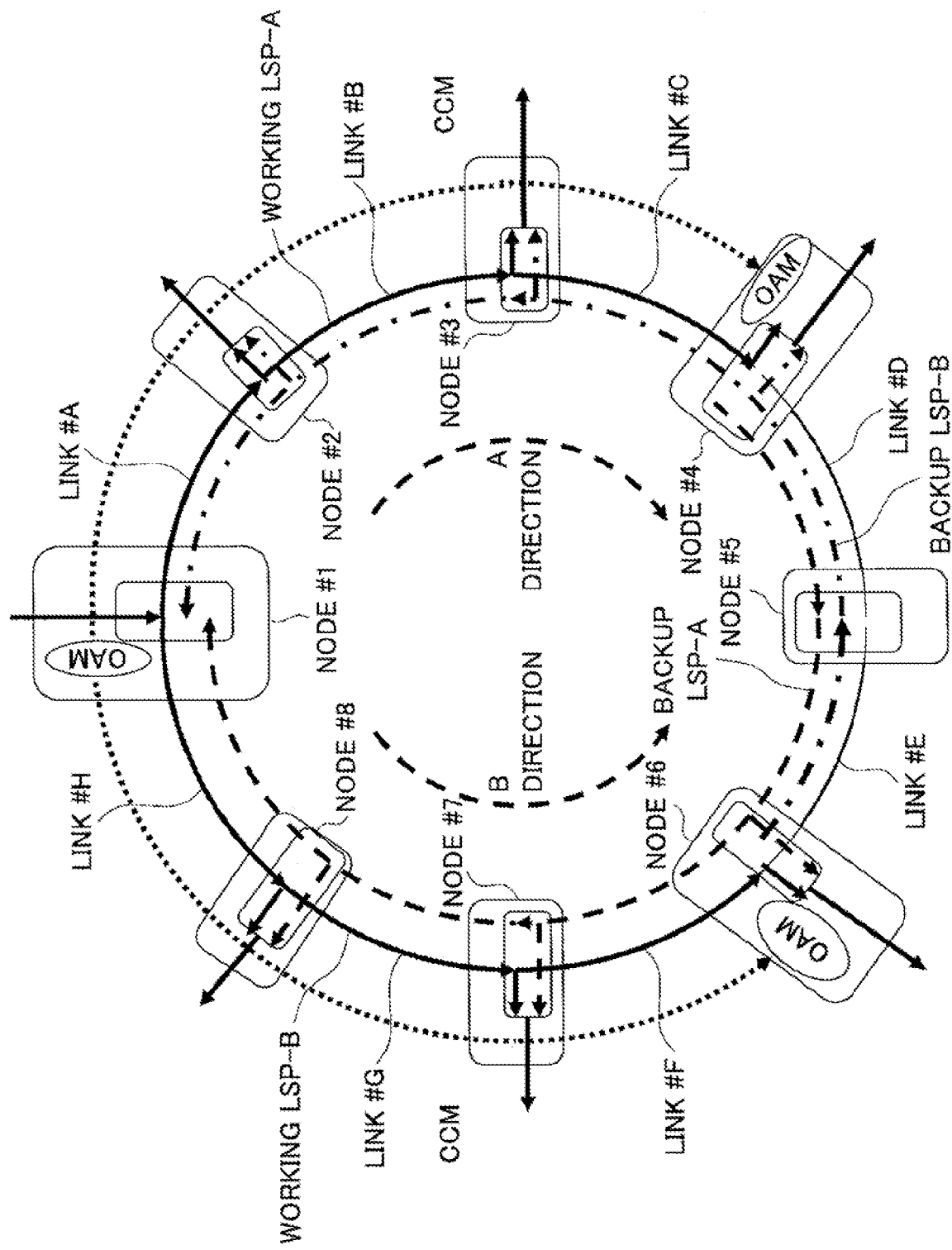
FIG. 17 is for describing a fault recovery operation.

FIG. 17 indicates a normal state. An OAM packet of CCM is transmitted from the OAM packet processor 64 in the node #1 onto a working LSP-A in the A direction and a working LSP-B in the B direction. The OAM packet processor 64 in the node #4 defining the terminal point of the working LSP-A in the A direction and the OAM packet processor 64 in the node #6 defining the terminal point of the working LSP-B in the B direction receive the OAM packet of CCM, and are determined as being in a normal state.

Figure 18:
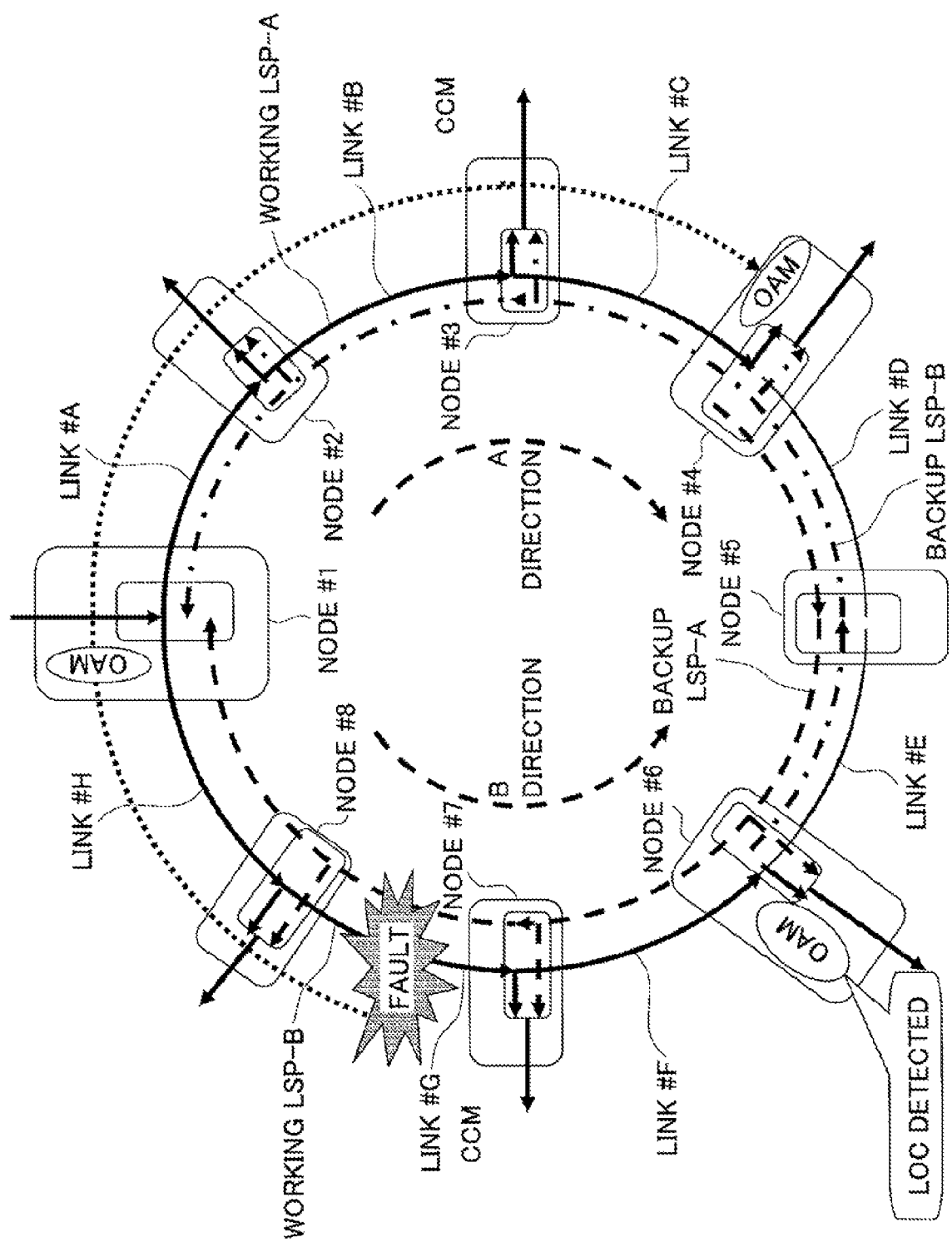
FIG. 18 is for describing a fault recovery operation.

FIG. 18 indicates a state where a fault has occurred at the link #G between the node #8 and the node #7. Due to a fault in link #G, the OAM packet processor 64 in the node #6 defining the terminal point of the working LSP-B in the B direction does not receive an OAM packet of CCM transmitted by the OAM packet processor 64 in the transmitting node #1. Accordingly, LOC is detected.

Figure 19:
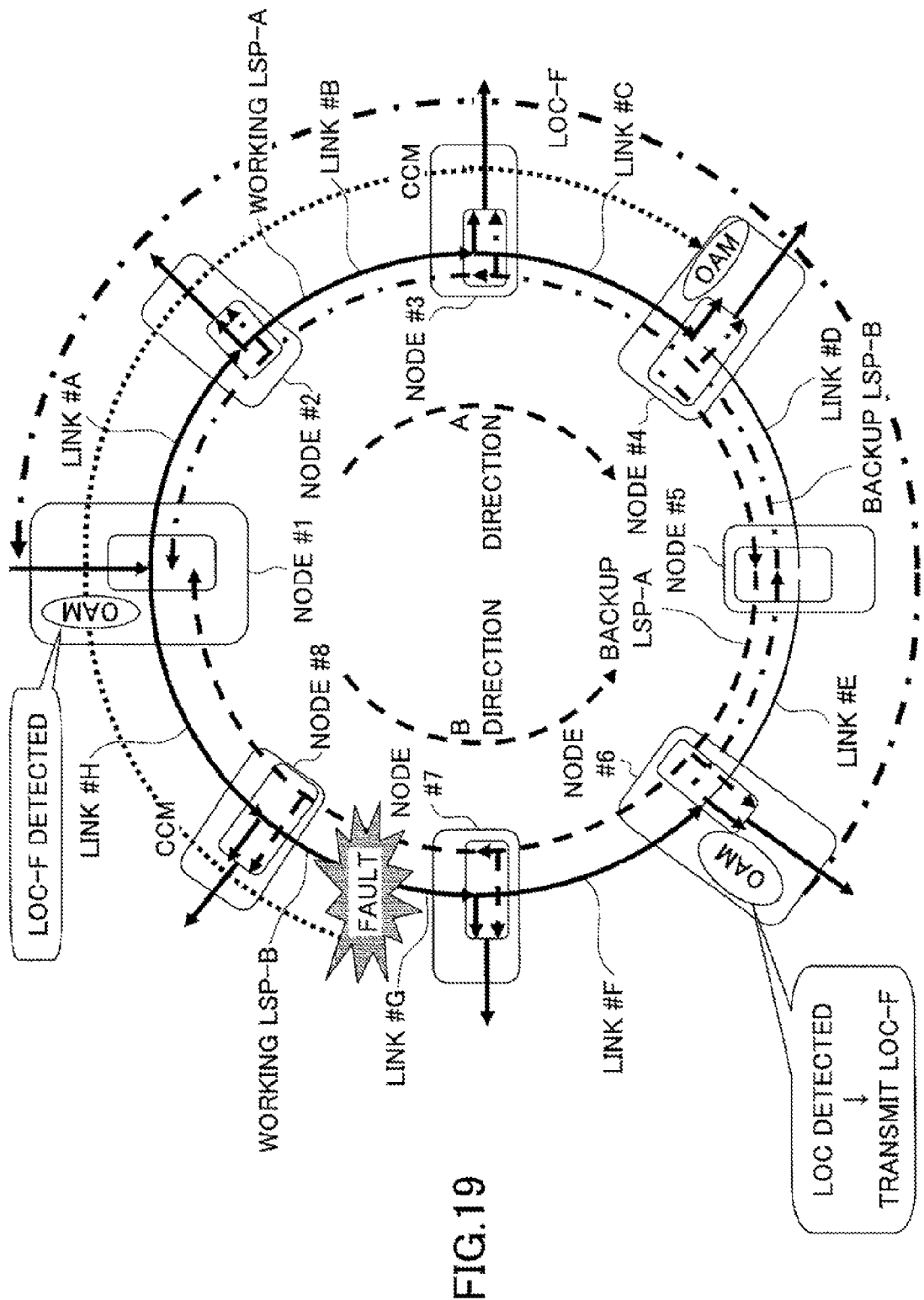
FIG. 19 is for describing a fault recovery operation.

Next, as indicated in FIG. 19, the OAM packet processor 64 in the node #6 transmits an OAM packet of a LOC occurrence report (LOC-F) to the OAM packet processor 64 in the node #1 in the backup LSP-B in the B direction.

Figure 20:
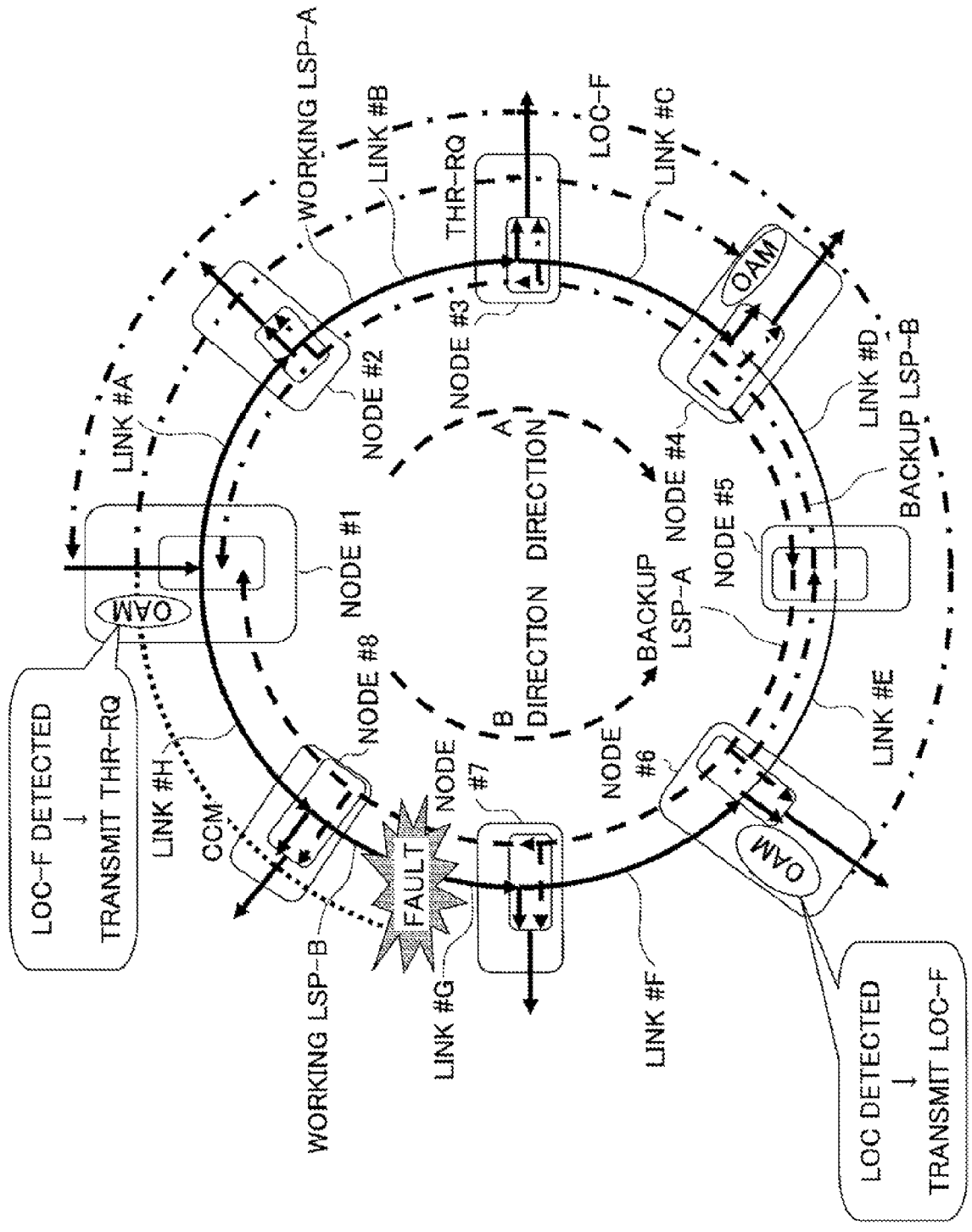
FIG. 20 is for describing a fault recovery operation.

The OAM packet processor 64 in the node #1 receives an OAM packet of LOC-F from the node #6 in the backup LSP-B in the B direction. Furthermore, as indicated in FIG. 20, the OAM packet processor 64 in the node #1 transmits an OAM packet of a switch request (THR-RQ) onto the working LSP-A in the A direction to the OAM packet processor 64 in the node #4.

Figure 21:
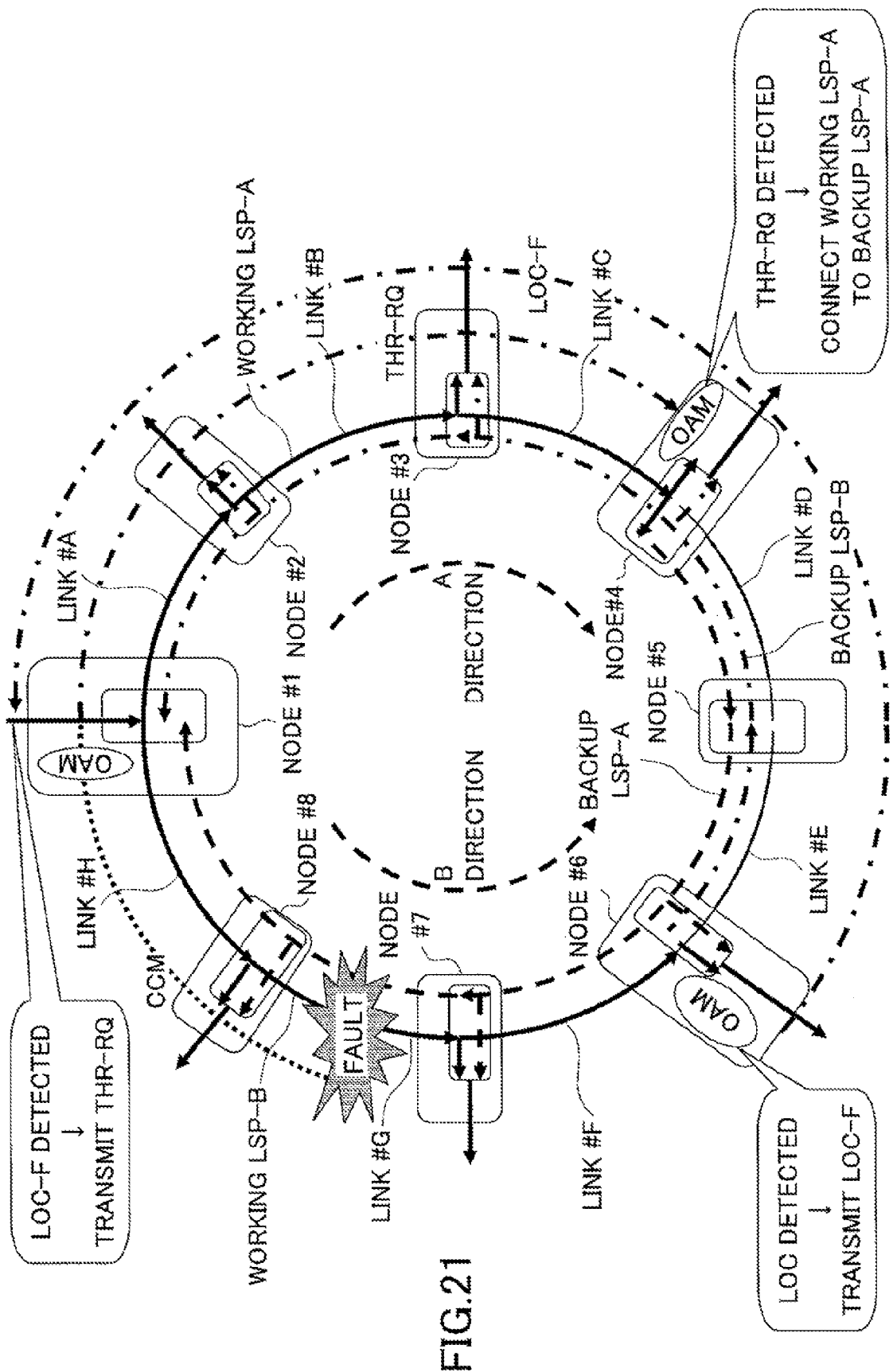
FIG. 21 is for describing a fault recovery operation.

The OAM packet processor 64 in the node #4 receives the OAM packet of THR-RQ from the node #1 in the working LSP-A in the A direction. Furthermore, as indicated in FIG. 21, the OAM packet processor 64 in the node #4 gives an instruction to connect the working LSP-A in the A direction with the backup LSP-A in the A direction in itself. Accordingly, the nodes #1 through #8 perform the switch according to descriptions relevant to a fault occurring in the working LSP in the B direction in the LSP management information indicated in FIG. 12. According to the above operations, signals of the working LSP in the A direction are connected to the backup LSP-A in the A direction in the node #4, and are transmitted to the node #6 and the node #7 via the node #5, and the fault is recovered. That is to say, the transmission delay under normal circumstances is reduced. Furthermore, at the time of fault recovery, the working LSP-A (nodes #1, #2, #3, #4) and the backup LSP-A (nodes #4, #5, #6, #7) in the A direction do not overlap each other, and therefore the signal band is efficiently used.

The present embodiment is applicable to a working multicast label switch path and a backup multicast label switch path that are linked, and the network topology is not limited to a ring.

Second Embodiment

Figure 22:
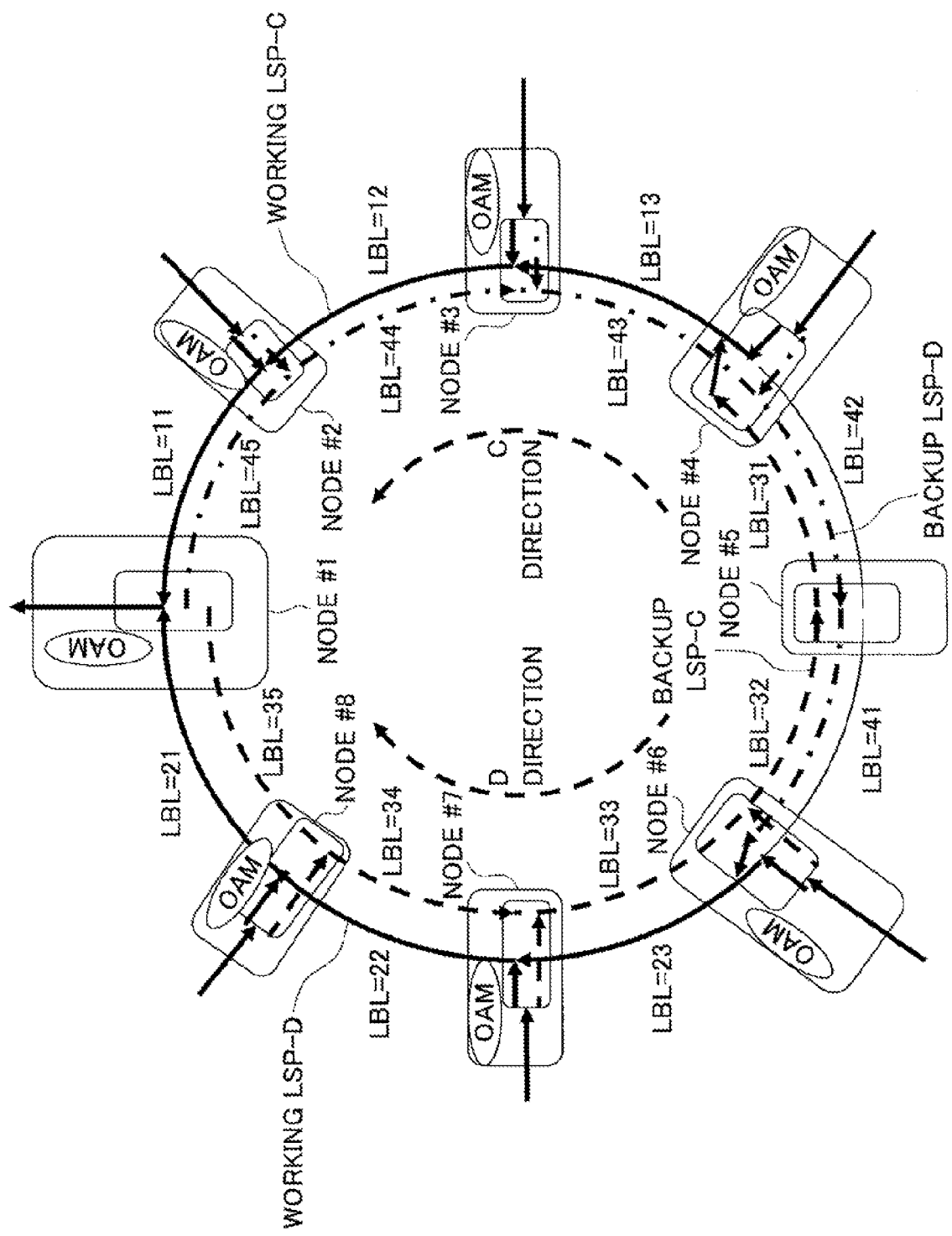
FIG. 22 illustrates a ring network according to a second embodiment.

FIG. 22 illustrates a ring network according to a second embodiment. The ring network of FIG. 22 indicates an LSP configuration for transferring request signals and response signals that are delivered by multicast from terminals and devices to the terminals and devices that are the multicast delivery sources.

FIG. 22 indicates an example of a ring network, in which the nodes #1 through #8 of the MPLS-TP scheme are connected in a ring shape by links #A through #H.

Furthermore, as a backup LSP for a working LSP-C (nodes #4, #3, #2, #1) in the C direction (counterclockwise direction), a backup LSP-D (nodes #4, #5, #6, #7, #8, #1) in the D direction (clockwise direction) is formed. That is to say, following the working LSP-C extending from the receiving node #1 to the transmitting node #4 defining the terminal point, there is provided the backup LSP-D connecting the transmitting node #4 defining the terminal point through the receiving node #1 in a ring shape.

Furthermore, as a backup LSP for a working LSP-D (nodes #6, #7, #8, #1) in the D direction, a backup LSP-C (nodes #6, #5, #4, #3, #2, #1) in the C direction is formed. That is to say, following the working LSP-D extending from the receiving node #1 to the transmitting node #6 defining the terminal point, there is provided the backup LSP-C connecting the transmitting node #6 defining the terminal point through the receiving node #1 in a ring shape. Among the nodes #1 through #8, at least the transmitting node or the receiving node defining the terminal point of the working LSP has an OAM packet processor (indicated as "OAM" in FIG. 22).

The receiving node #1 has a function of receiving OAM packets from the working LSP-C in the C direction and the working LSP-D in the D direction, and a function of adding (inserting) OAM packets to the backup LSP-C in the C direction and the backup LSP-D in the D direction.

The OAM packet processor 64 in the receiving node #1 has the following functions. One function is for monitoring reception of OAM packets in the working LSP-C in the C direction, and detecting a fault state (LOC) in the C direction when OAM packets are not received for a predetermined period. Another function is for monitoring reception of OAM packets in the working LSP-D in the D direction, and detecting a fault state (LOC) in the D direction when OAM packets are not received for a predetermined period. Yet another function is for transmitting OAM packets of LOC occurrence reports (LOC-F) onto the backup LSP-C in the C direction to the OAM packet processor 64 in the node #4 defining the terminal point far away from the receiving node in the working LSP-D in the D direction, when LOC is detected in the working LSP-C in the C direction. Yet another function is for transmitting OAM packets of LOC occurrence reports (LOC-F) onto the backup LSP-D in the D direction to the OAM packet processor 64 in the node #6 defining the terminal point far away from the receiving node in the working LSP-C in the C direction, when LOC is detected in the working LSP-D in the D direction.

The transmitting nodes #2, #3, #4, #6, #7, #8 have a function of selecting either one of a working LSP and a backup LSP and adding (inserting) signals.

The transmitting node #4 defining the terminal point of the working LSP in the C direction has the following functions. One function is for connecting the backup LSP-C to the working LSP-C. Another function is for inserting OAM packets in the working LSP-C, and receiving OAM packets from the backup LSP-C. Yet another function is for switching the LSP to which signals are to be added, from the working LSP-C to the backup LSP-D, according to instructions from the OAM packet processor 64 in itself.

The transmitting node #6 defining the terminal point of the working LSP in the D direction has the following functions. One function is for connecting the backup LSP-D to the working LSP-D. Another function is for inserting OAM packets in the working LSP-D, and receiving OAM packets from the backup LSP-D. Yet another function is for switching the LSP to which signals are to be added, from the working LSP-D to the backup LSP-C, according to instructions from the OAM packet processor 64 in itself.

The OAM packet processor 64 in the transmitting node #4 defining the terminal point of the working LSP-C in the C direction has the following functions. One function is for periodically transmitting OAM packets of CCM onto the working LSP-C in the C direction to the OAM packet processor 64 in the receiving node #1. Another function is for transmitting OAM packets of switch requests (SW-RQ) onto the working LSP-C in the C direction and switching the LSP to which signals are to be added from the working LSP-C to the backup LSP-D, when an OAM packet of an LOC occurrence report (LOC-F) is received from the OAM packet processor 64 in the receiving node #1 via the backup LSP-C in the C direction.

The OAM packet processor 64 in the transmitting node #6 defining the terminal point of the working LSP in the D direction has the following functions. One function is for periodically transmitting OAM packets of CCM onto the working LSP-D in the D direction to the OAM packet processor 64 in the receiving node #1. Another function is for transmitting OAM packets of switch requests (SW-RQ) onto the working LSP-D in the D direction and switching the LSP to which signals are to be added from the working LSP-D to the backup LSP-C, when an OAM packet of an LOC occurrence report (LOC-F) is received from the OAM packet processor 64 in the receiving node #1 via the backup LSP-D in the D direction.

Among the transmitting nodes, the nodes #2 and #3 in the middle of the working LSP-C have a function of receiving and relaying the OAM packets of the working LSP-C, and a function of switching the LSP to which signals are to be added from the working LSP-C to the backup LSP-D according to instructions from the OAM packet processor 64 in themselves. Nodes in the middle are the transmitting nodes excluding transmitting nodes defining the terminal points of the LSP.

Among the transmitting nodes, the nodes #7 and #8 in the middle of the working LSP-D have a function of receiving and relaying the OAM packets of the working LSP-D, and a function of switching the LSP to which signals are to be added from the working LSP-D to the backup LSP-C according to instructions from the OAM packet processor 64 in itself.

The OAM packet processor 64 in the nodes #2 and #3 in the middle of the working LSP-C has the following functions. One function is for relaying an OAM packet of CCM transmitted by the transmitting node #4 defining the terminal point of the working LSP-C to the next working LSP-C. Another function is for relaying a received OAM packet to the next working LSP-C and switching the LSP to which signals are to be added from the working LSP-C to the backup LSP-D, when an OAM packet of a switch request (SW-RQ) transmitted by the transmitting node #4 defining the terminal point of the working LSP-C is received.

The OAM packet processor 64 in the nodes #7 and #8 in the middle of the working LSP-D has the following functions. One function is for relaying an OAM packet of CCM transmitted by the transmitting node #6 defining the terminal point of the working LSP-D to the next working LSP-D. Another function is for relaying a received OAM packet to the next working LSP-D and switching the LSP to which signals are to be added from the working LSP-D to the backup LSP-C, when an OAM packet of a switch request (SW-RQ) transmitted by the transmitting node #6 defining the terminal point of the working LSP-D is received.

The hardware configuration and functional blocks of the node devices according to the second embodiment are the same as those indicated in FIGS. 10 and 11. Furthermore, the in-device header and OAM packets are also as indicated in FIGS. 13 and 14.

LSP Management Information

FIG. 23 indicates LSP management information stored in the label table storage unit 62 of each node according to the second embodiment. The LSP management information includes, for each node, an LSP management number, an input LIU number, an input label (LBL), an output 1-LIU number, an output 1-label (LBL), an output 2-LIU number, and an output 2-label (LBL). These information items are provided for a normal state, a recovering state of a working LSP in the C direction, and a recovering state of a working LSP in the D direction. In FIG. 23, the LSP management information items for nodes #1 through #8 are described; however, the label table storage unit 62 of each node may only store the LSP management information of its own node.

The information indicates that a signal, which has a label value indicated by the input LBL of a client interface port or a network interface port indicated in the input LIU number, is to be routed as a packet having a label value indicated by an output LBL of a client interface port or a network interface port indicated in the output LIU. The information indicates that when there are two output LIUs set for one input, the input signals are to be bridged to two output LIUs.

The nodes #4 and #6 defining the terminal points of the working LSP change the routing of the label switch processor 63 when an OAM packet of a LOC occurrence report (LOC-F) is received. The transmitting nodes #2, #3, #4, #6, #7, #8 change the routing of the label switch processor 63 when an OAM packet of a switch request (SW-RQ) to implement signal connection from a working LSP to a backup LSP is received.

Flowchart

Figure 24A:
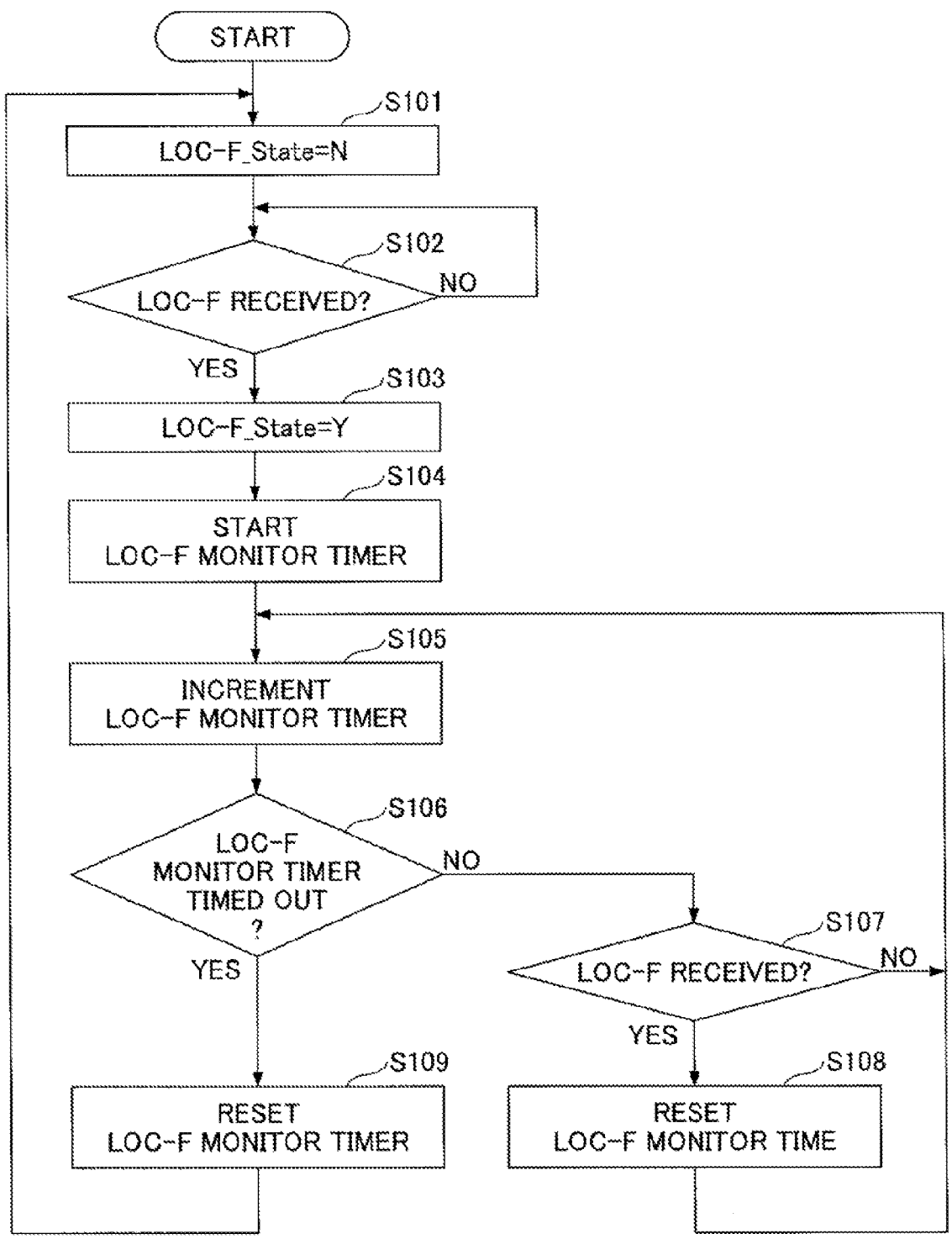
FIG. 24A is a flowchart of an OAM packet receiving process executed by a node defining a terminal point of a working LSP.
Figure 24B:
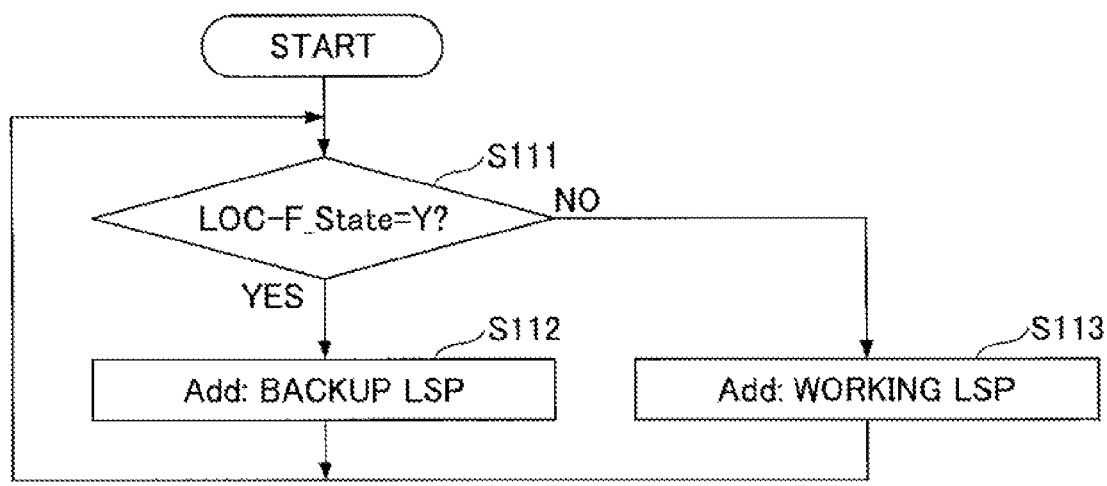
FIG. 24B is a flowchart of a switch instruction process executed by a node defining a terminal point of a working LSP.
Figure 24C:
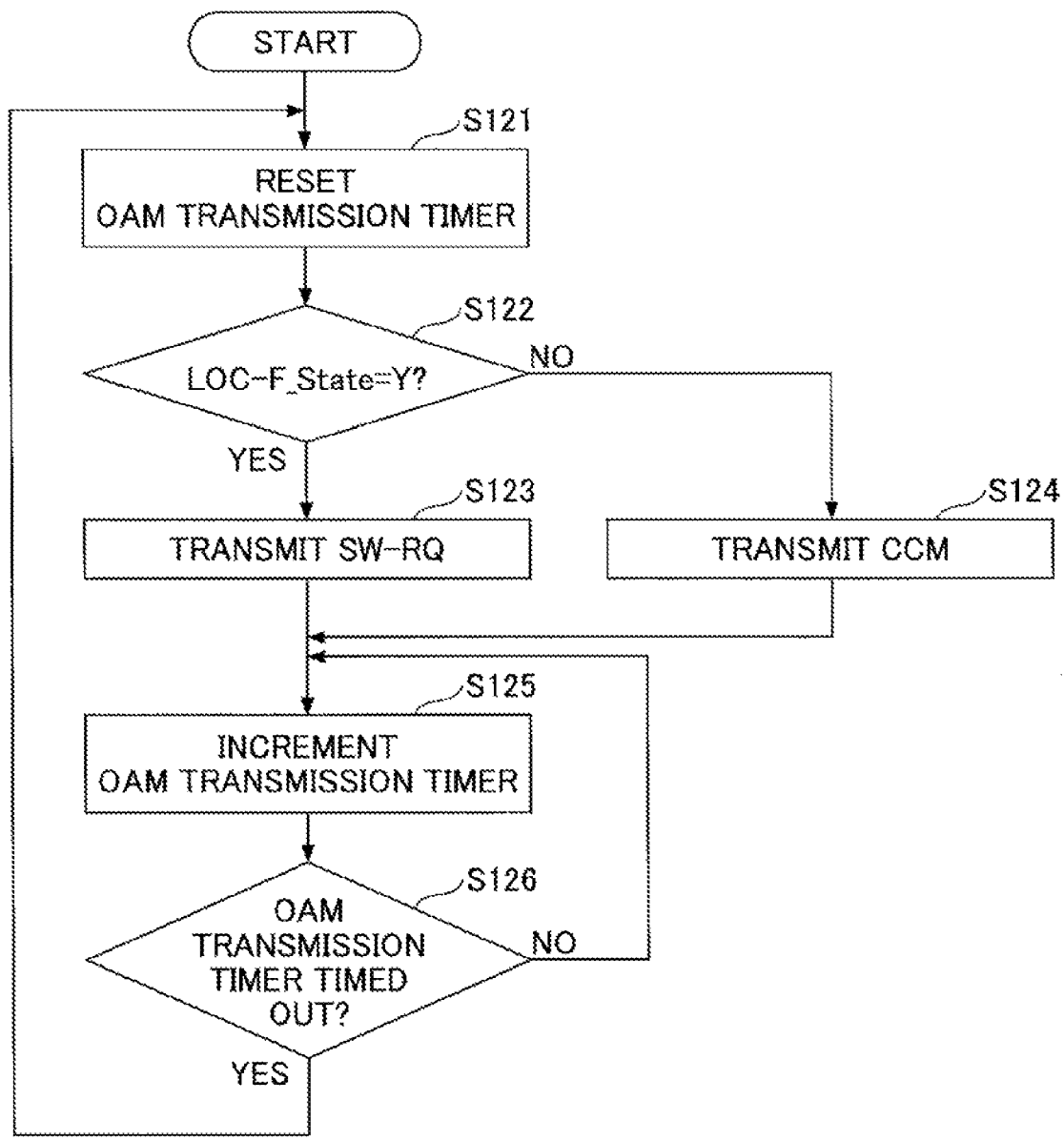
FIG. 24C is a flowchart of an OAM packet transmitting process executed by a node defining a terminal point of a working LSP.

FIGS. 24A, 24B, and 24C are flowcharts of an OAM packet receiving process, a switch instruction process, and an OAM packet transmitting process executed by the OAM packet processor 64 in the nodes #4 and #6 defining terminal points of the working LSP.

In FIG. 24A, in step S101, N is set in LOC-F_State and a report is sent to the OAM packet transmitting process and the switch instruction process. In step S102, it is determined whether an OAM packet of a LOC occurrence report (LOC-F) has been received, and when LOC-F has been received, the process proceeds to step S103. In step S103, Y is set in LOC-F_State and a report is sent to the OAM packet transmitting process and the switch instruction process. In step S104, an LOC-F monitor timer is started.

Next, in step S105, the LOC-F monitor timer is incremented, and in step S106, it is determined whether the LOC-F monitor timer is timed out. For example, the LOC-F monitor timer becomes timed out in several tens of msec. If the LOC-F monitor timer is not timed out, in step S107, it is determined whether an OAM packet of LOC-F has been received.

When LOC-F has been received, in step S108, the LOC-F monitor timer is reset and the process returns to step S105. When LOC-F has not been received, the process returns to step S105 without resetting the timer. Meanwhile, in step S106, when the LOC-F monitor timer is timed out, in step S109, the LOC-F monitor timer is stopped, and the process returns to step S101.

In FIG. 24B, in step S111, it is determined whether LOC-F_State=Y. When it is determined that LOC-F_State=Y, in step S112, an instruction is given to change routing of adding signals to the backup LSP. When it is determined that LOC-F_State=N, in step S113, an instruction is given to change routing of adding signals to the working LSP.

In the FIG. 24C, in step S121, the OAM transmission timer is reset. In step S122, it is determined whether LOC-F_State=Y. If the determination result is LOC-F_State=Y in step S122, in step S123, an OAM packet of a switch request (SW-RQ) is transmitted. If the determination result is LOC-F_State=N, in step S124, an OAM packet of CCM for monitoring is transmitted.

Next, in step S125, the OAM transmission timer is incremented, and in step S126, it is determined whether the OAM transmission timer is timed out. The OAM transmission timer becomes timed out in, for example, several msec through several tens of msec. If the OAM transmission timer is not timed out, the process returns to step S125, and if the OAM transmission timer is timed out, the process returns to step S121.

Figure 25A:
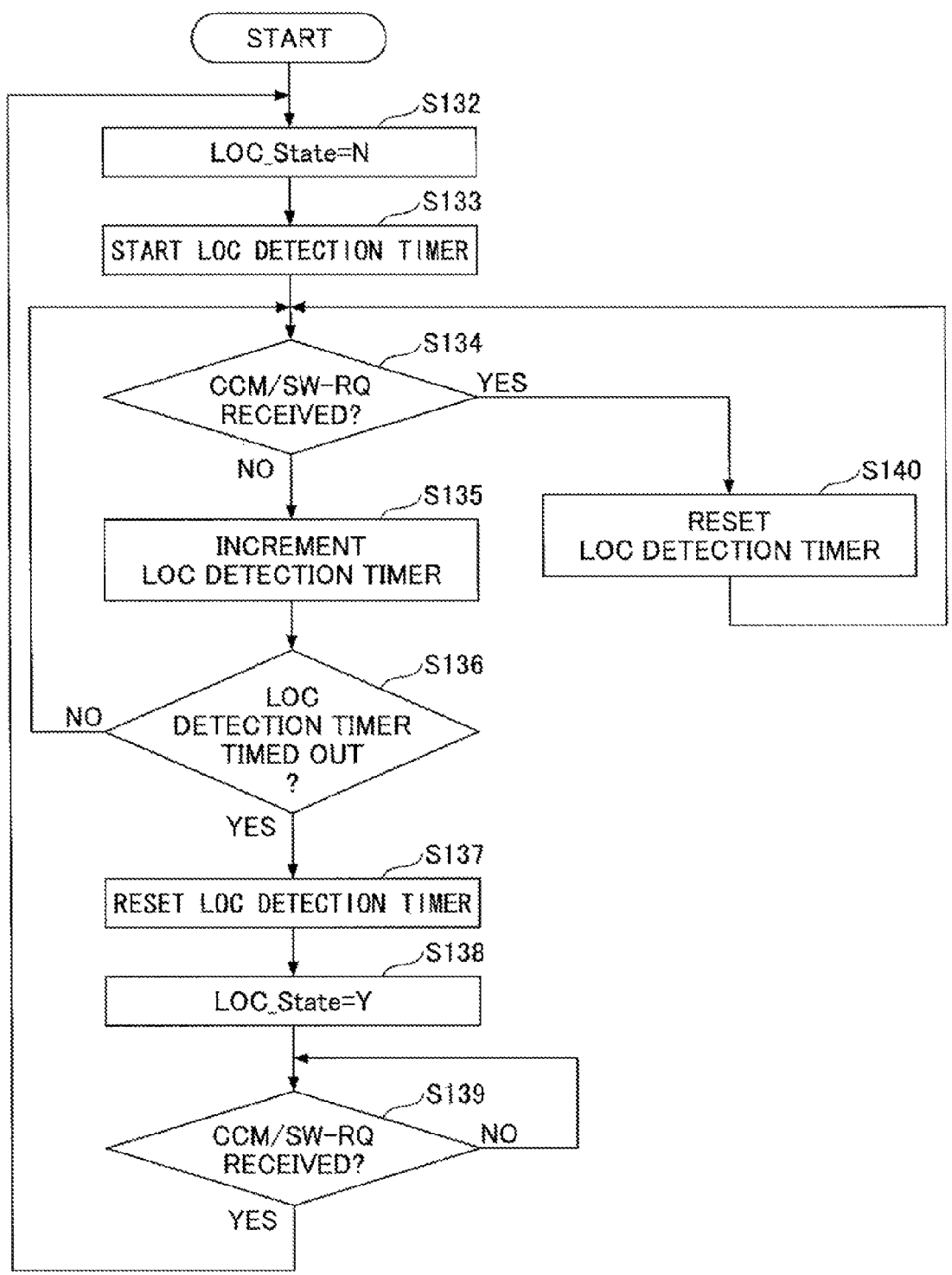
FIG. 25A is a flowchart of an OAM packet receiving process in a C direction executed by a receiving node.
Figure 25B:
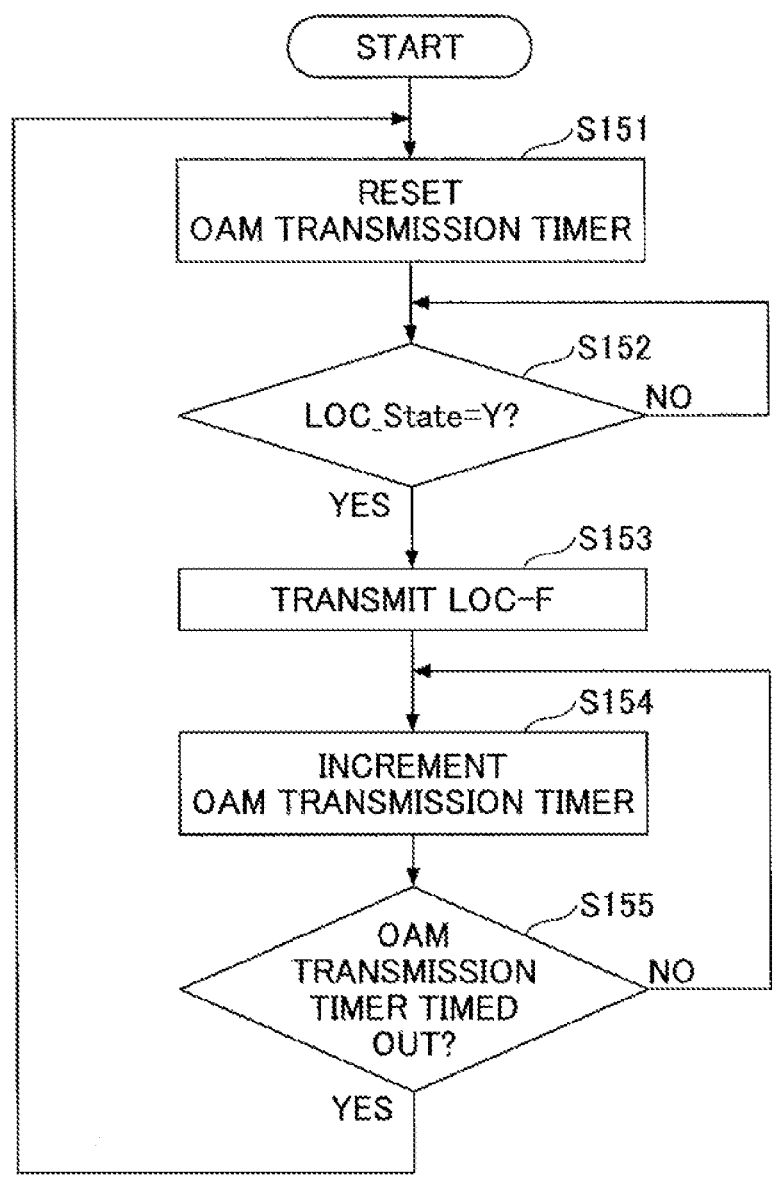
FIG. 25B is a flowchart of an OAM packet transmitting process in a C direction executed by a receiving node.

FIGS. 25A and 25B are flowcharts of an OAM packet receiving process in the C direction and an OAM packet transmitting process in the C direction executed by the OAM packet processor 64 in the receiving node #1.

In FIG. 25A, in step S132, N is set in LOC-F_State and a report is sent to the switch instruction process. In step S133, the LOC detection timer is started.

Next, in step S134, it is determined whether an OAM packet of CCM or SW-RQ is received. When an OAM packet of CCM or SW-RQ is not received, in step S135, the LOC detection timer is incremented, and in step S136 it is determined whether the LOC detection timer is timed out. For example, the LOC detection timer becomes timed out in several tens of msec. If the LOC detection timer is not timed out, the process returns to step S134, and if the LOC detection timer is timed out, the process returns to step S137.

In step S137, the LOC detection timer is reset. In step S138, Y is set in LOC_State and a report is sent to the OAM packet transmitting process in the C direction. Next, in step S139, it is determined whether an OAM packet of CCM or SW-RQ has been received. When an OAM packet of CCM or SW-RQ has been received, the process returns to step S132.

Meanwhile, when an OAM packet of CCM or SW-RQ has been received in step S134, in step S140, the LOC detection timer is reset and the process returns to step S134.

In FIG. 25B, in step S151, the OAM transmission timer is reset. In step S152, it is determined whether LOC_State=Y. If the determination result is LOC_State=Y in step S152, in step S153, an OAM packet of an LOC occurrence report (LOC-F) is transmitted. Next, in step S154, the OAM transmission timer is incremented, and in step S155, it is determined whether the OAM transmission timer is timed out. The OAM transmission timer becomes timed out in, for example, several msec through several tens of msec. If the OAM transmission timer is not timed out, the process returns to step S154, and if the OAM transmission timer is timed out, the process returns to step S151.

The OAM packet processor 64 in the receiving node #1 executes the OAM packet reception process in the D direction and the OAM packet transmission process in the D direction in the same manner as those indicated in FIG. 25A and FIG. 25B.

Figure 26A:
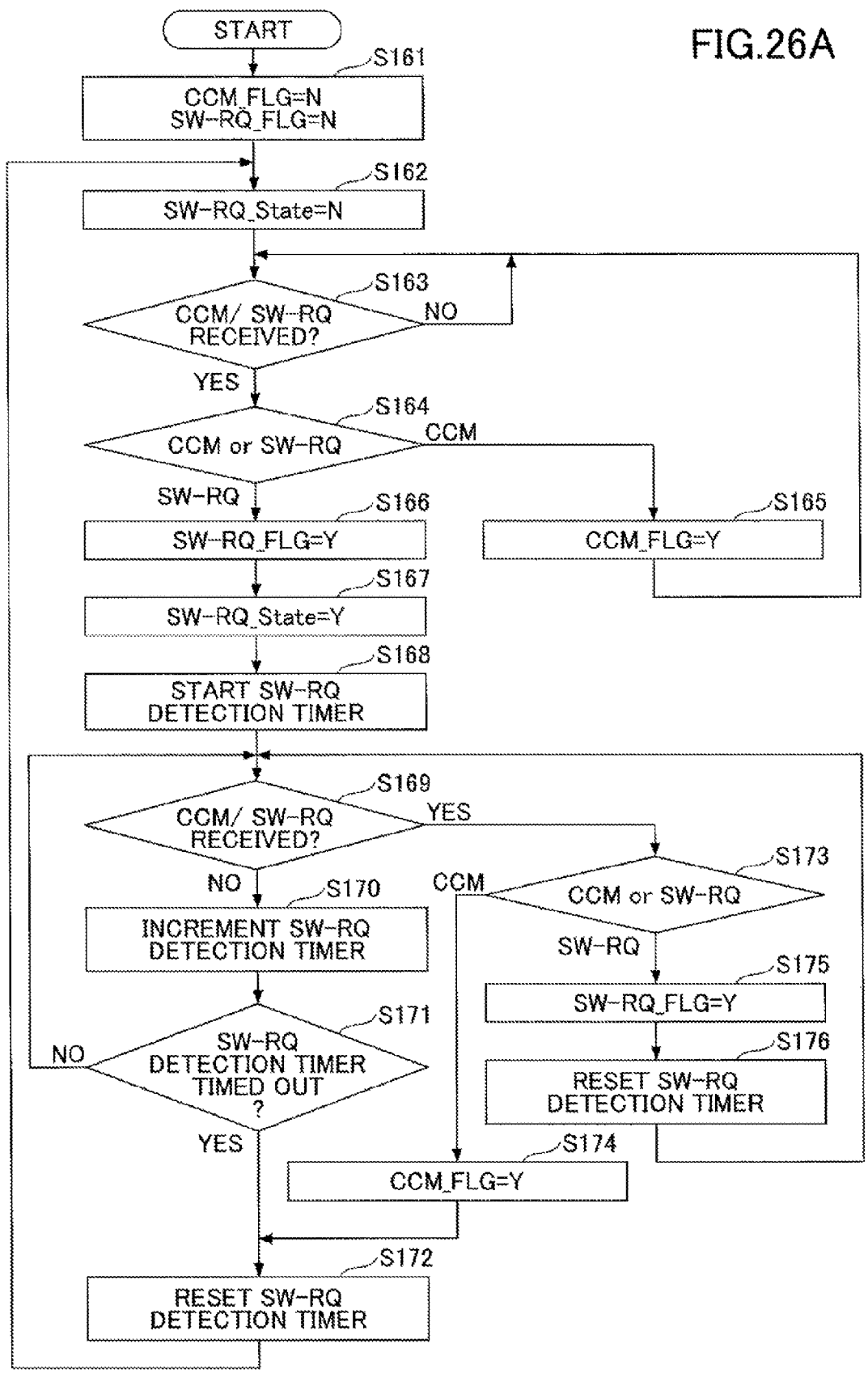
FIG. 26A is a flowchart of an OAM packet receiving process executed by a middle node.
Figure 26B:
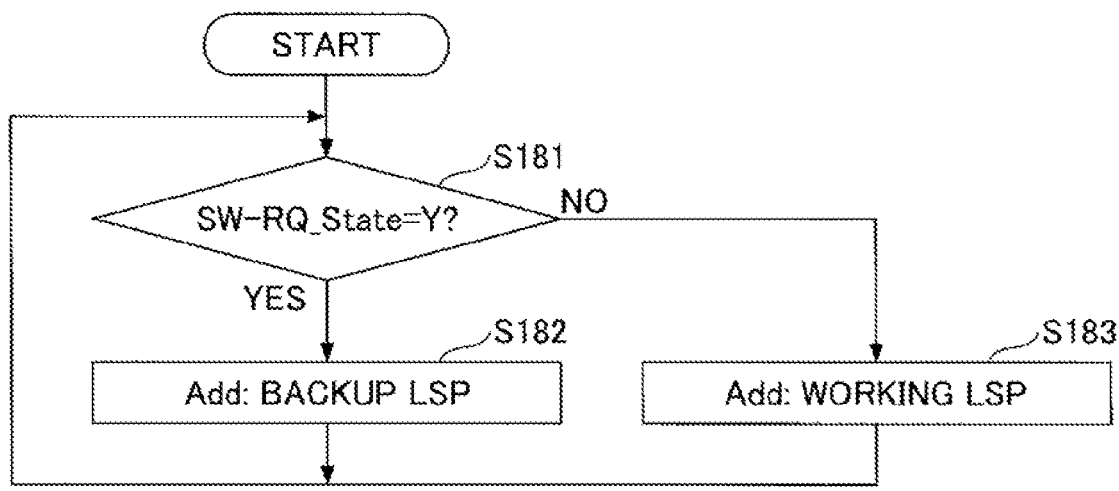
FIG. 26B is a flowchart of a switch instruction process executed by a middle node.
Figure 26C:
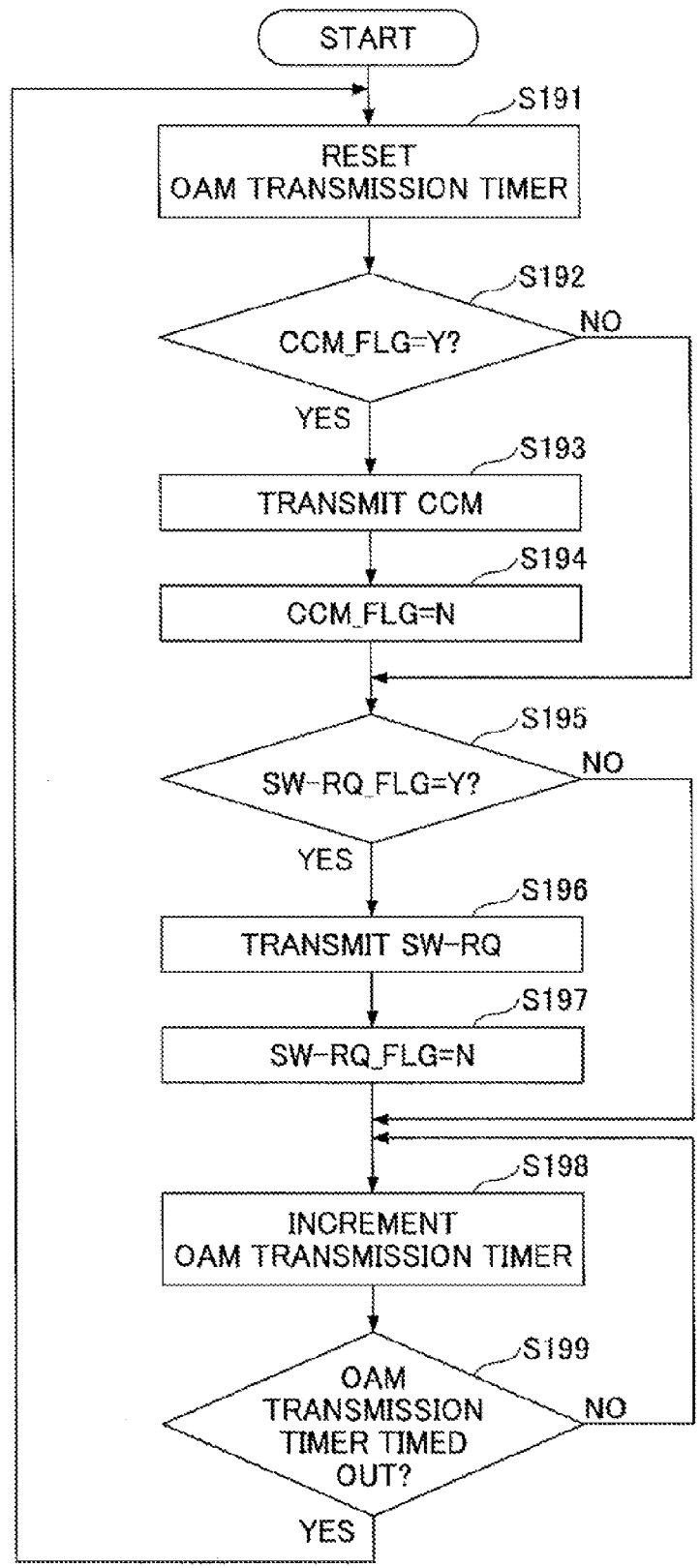
FIG. 26C is a flowchart of an OAM packet transmitting process executed by a middle node.

FIGS. 26A, 26B, and 26C are flowcharts of an OAM packet receiving process, a switch instruction process executed by the OAM packet transmitting process executed by the OAM packet processor 64 in the middle nodes #2, #3, #7, #8.

In FIG. 26A, in step S161, N is set in CCM_FLG and SW-RQ_FLG and a report is sent to the OAM packet transmitting process. In step S162, N is set in SW-RQ_State and a report is sent to the switch instruction process.

Next, in step S163, it is determined whether an OAM packet of CCM or SW-RQ is received. When an OAM packet of CCM or SW-RQ is received, the process proceeds to step S164, and it is determined whether the OAM packet is of CCM or SW-RQ. When the OAM packet is of CCM, in step S165, Y is set in CCM_FLG and a report is sent to the OAM packet reception process, and the process returns to step S163. When the OAM packet is of SW-RQ, in step S166, Y is set in SW-RQ_FLG and a report is sent to the OAM packet reception process, in step S167, Y is set in SW-RQ_State and a report is set to the switch instruction process, and in step S168, a SW-RQ detection timer is started.

Next, in step S169, it is determined whether an OAM packet of CCM or SW-RQ is received. When an OAM packet of CCM or SW-RQ is not received, in step S170, the SW-RQ detection timer is incremented, and in step S171, it is determined whether the SW-RQ detection timer is timed out. For example, the SW-RQ detection timer becomes timed out in several tens of msec. If the SW-RQ detection timer is not timed out, the process returns to step S169, and if the SW-RQ detection timer is timed out, in step S172, the SW-RQ detection timer is reset and the process returns to step S162.

Next, in step S169, when an OAM packet of CCM or SW-RQ is received, in step S173, it is determined whether the OAM packet is of CCM or SW-RQ. When the OAM packet is of CCM, in step S174, Y is set in CCM_FLG and a report is sent to the OAM packet reception process, and the process proceeds to step S172. When the OAM packet is of SW-RQ, in step S175, Y is set in SW-RQ_FLG and a report is sent to the OAM packet reception process. Next, in step S176, the SW-RQ detection timer is reset and the process returns to step S169.

In FIG. 26B, in step S181, it is determined whether SW-RQ_State=Y. When it is determined that SW-RQ_State=Y, in step S182, an instruction is given to change routing so that the LSP to which signals are added is switched to the backup LSP. When it is determined that SW-RQ_State=N, in step S183, an instruction is given to change routing so that the LSP to which signals are added is switched to the working LSP.

In the FIG. 26C, in step S191, the OAM transmission timer is reset. In step S192, it is determined whether CCM_FLG=Y. If the determination result is CCM_FLG=Y in step S192, in step S193, an OAM packet of CCM is transmitted, and in step S194, N is set in CCM_FLG, and the process proceeds to step S195. If the determination result is CCM_FLG=N in step S192, the process proceeds to step S195.

In step S195, it is determined whether SW-RQ_FLG=Y. If the determination result is SW-RQ_FLG=Y in step S195, in step S196, an OAM packet of SW-RQ is transmitted, and in step S197, N is set in SW-RQ_FLG, and the process proceeds to step S198.

In step S198, the OAM transmission timer is incremented, and in step S199, it is determined whether the OAM transmission timer is timed out. The OAM transmission timer becomes timed out in, for example, several msec through several tens of msec. If the OAM transmission timer is not timed out, the process returns to step S198, and if the OAM transmission timer is timed out, the process returns to step S191.

Description of Fault Recovery Operation

Figure 27:
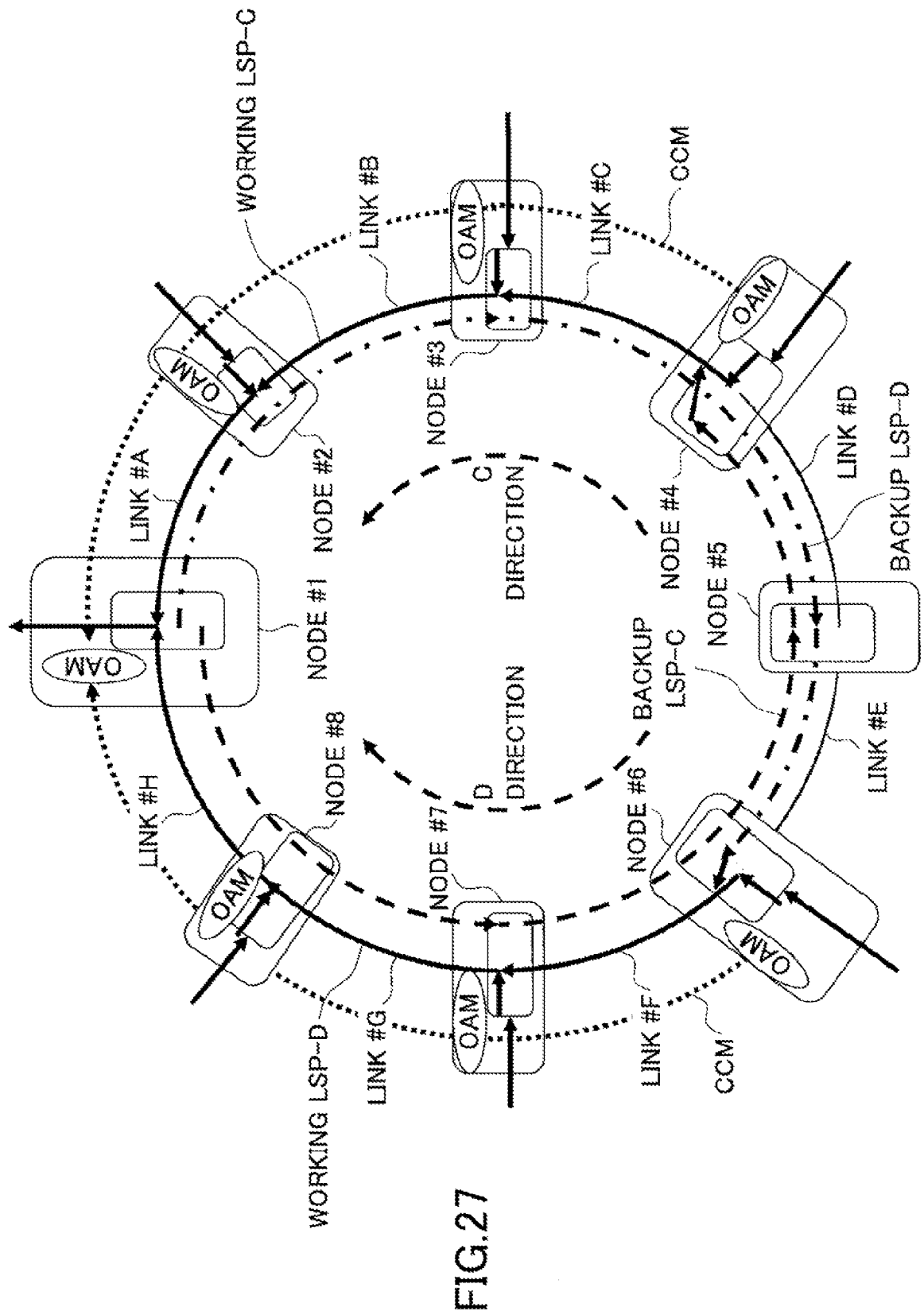
FIG. 27 is for describing a fault recovery operation.

FIG. 27 indicates a normal state. From the OAM packet processor 64 in the node #4 defining the terminal point of the working LSP-C, an OAM packet of CCM is transmitted onto the working LSP-C in the C direction. From the OAM packet processor 64 in the node #6 defining the terminal point of the working LSP-D, an OAM packet of CCM is transmitted onto the working LSP-D in the D direction. The OAM packet processor 64 in the receiving node #1 receives OAM packets of CCM from the working LSP-C and the working LSP-D, which are determined as being in a normal state. All transmitting nodes transmit signals to the working LSP.

Figure 28:
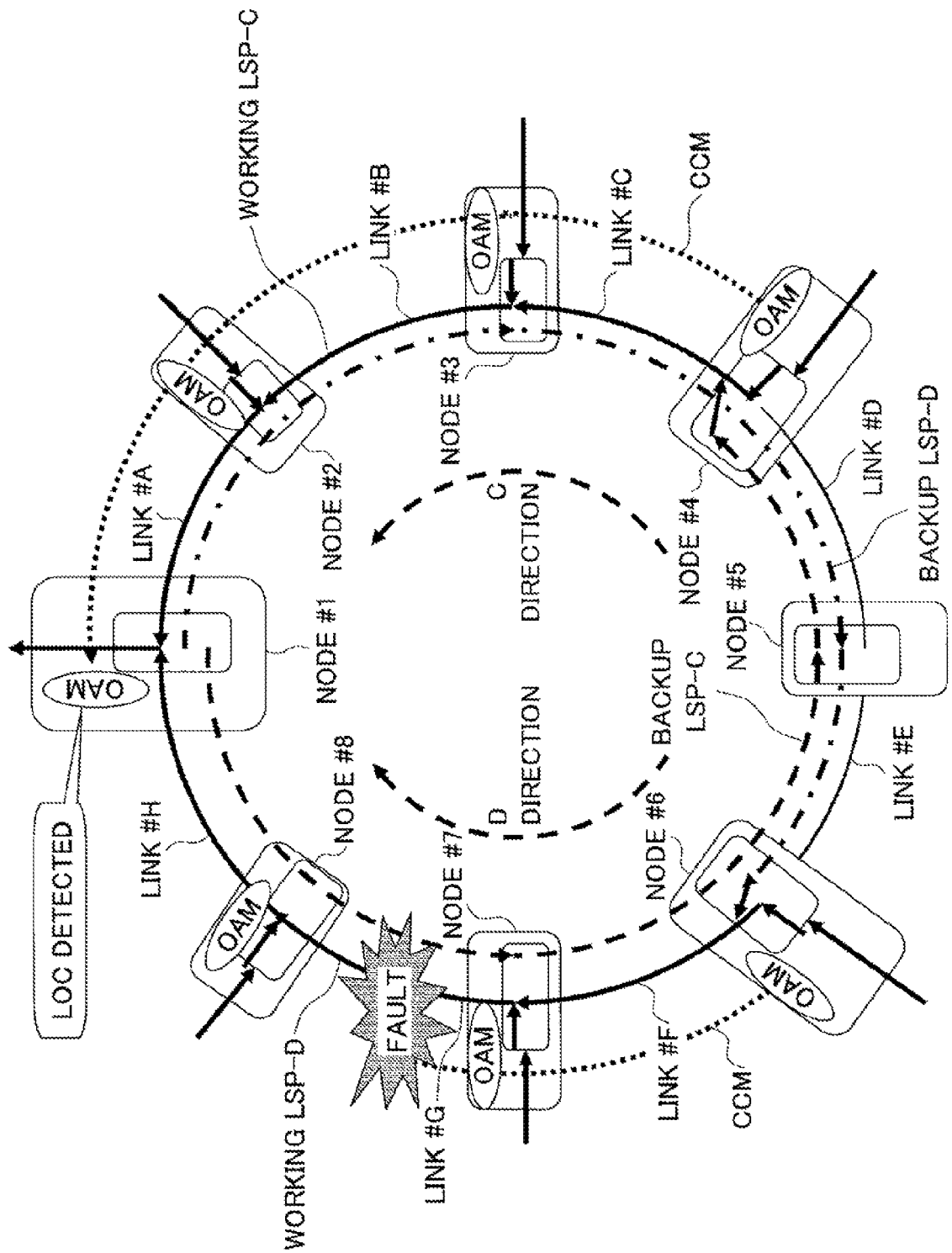
FIG. 28 is for describing a fault recovery operation.

FIG. 28 indicates a state where a fault has occurred at the link #G between the node #8 and the node #7. Due to a fault in link #G, the OAM packet processor 64 in the receiving node #1 does not receive an OAM packet of CCM transmitted by the OAM packet processor 64 in the node #6 defining the terminal point of the working LSP-D. Accordingly, LOC of the working LSP-D is detected.

Figure 29:
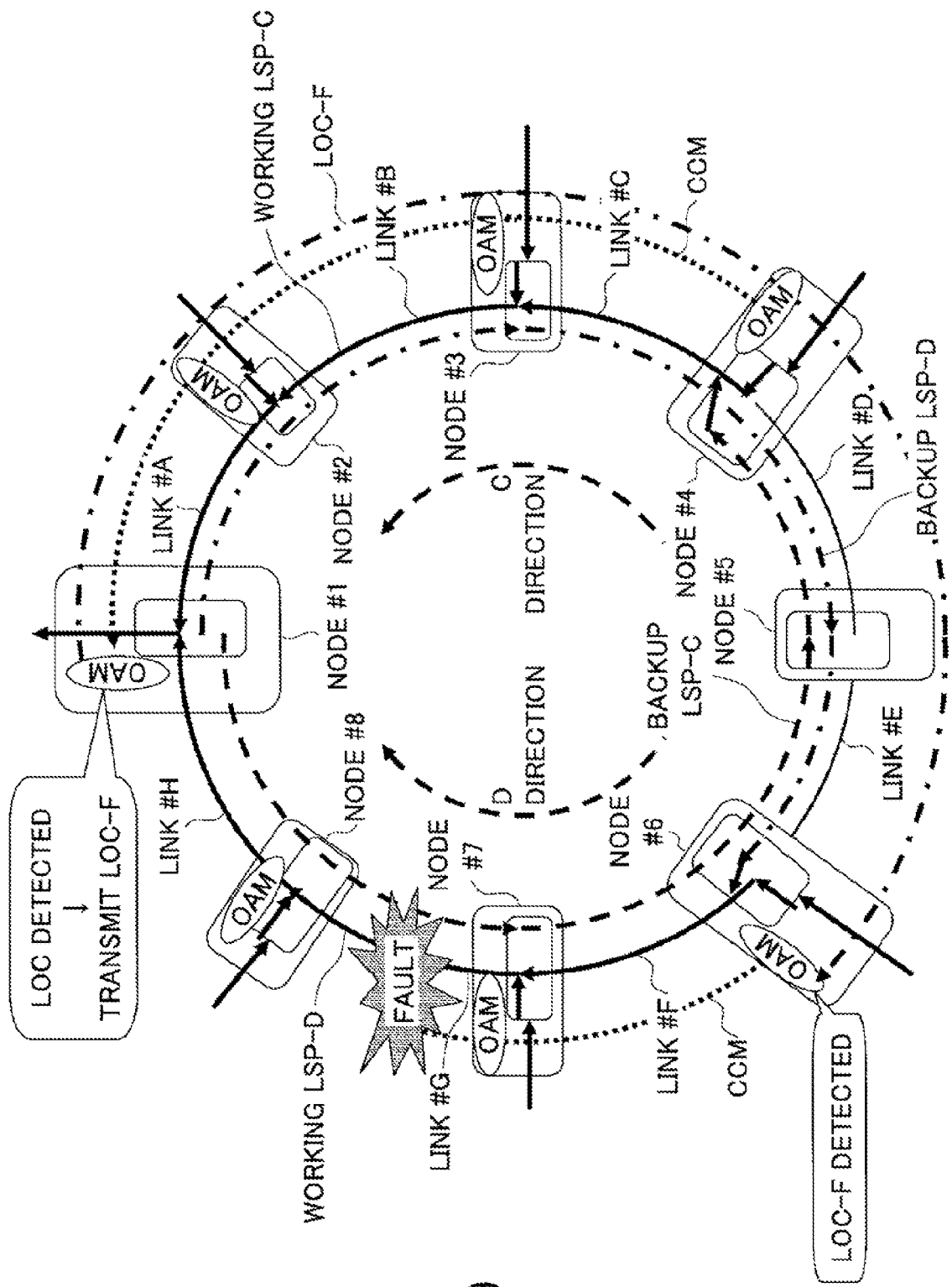
FIG. 29 is for describing a fault recovery operation.

Next, as indicated in FIG. 29, the OAM packet processor 64 in the receiving node #1 transmits an OAM packet of a LOC occurrence report (LOC-F) to the OAM packet processor 64 in the node #6 in the backup LSP-D in the D direction.

Figure 30:
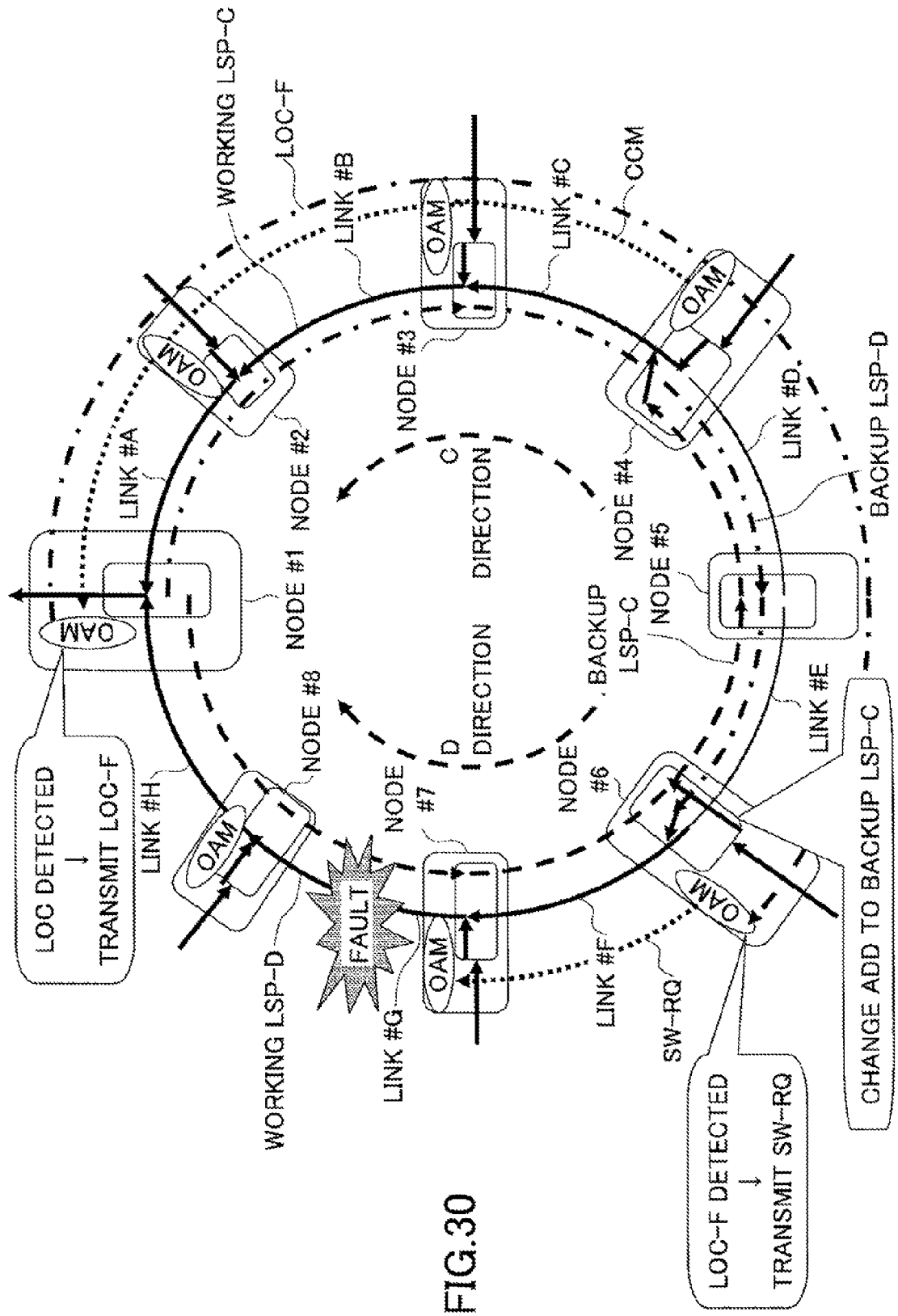
FIG. 30 is for describing a fault recovery operation.

The OAM packet processor 64 in the node #6 defining the terminal point of the working LSP-D receives an OAM packet of LOC-F from the receiving node #1 in the backup LSP-D in the D direction. Furthermore, as indicated in FIG. 30, the OAM packet processor 64 in the node #6 transmits an OAM packet of a switch request (SW-RQ) onto the working LSP-D in the D direction. Furthermore, the OAM packet processor 64 in the node #6 changes the LSP to which signals are to be added from the working LSP-D to the backup LSP-C, according to descriptions relevant to fault recovery of the working LSP in the D direction in the LSP management information indicated in FIG. 23.

Figure 31:
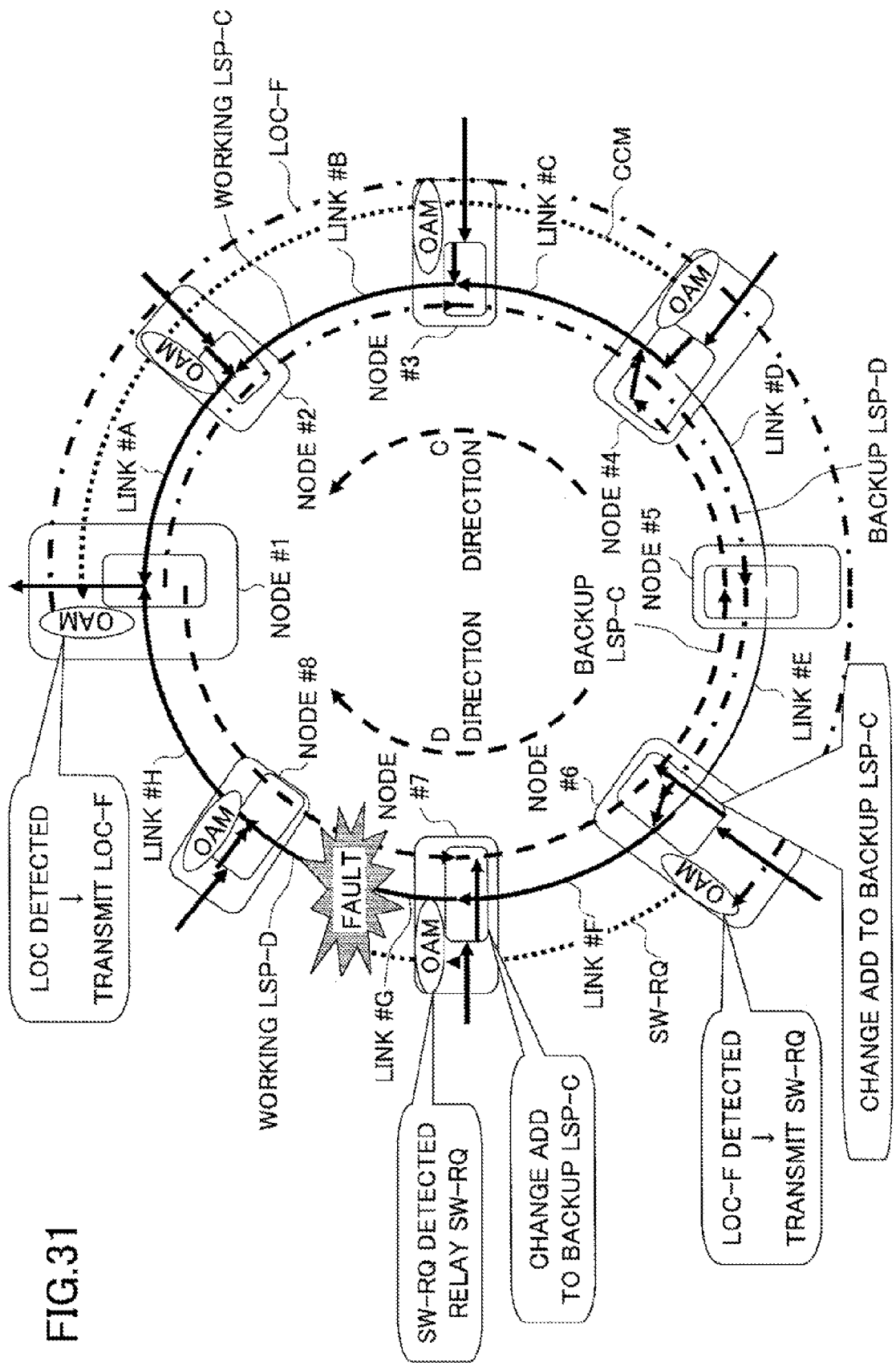
FIG. 31 is for describing a fault recovery operation.

The OAM packet processor 64 in the middle node #7 in the working LSP-D receives the OAM packet of SW-RQ from the node #6 defining the terminal point of the working LSP-D in the D direction. Furthermore, as indicated in FIG. 31, the OAM packet processor 64 relays an OAM packet of SW-RQ onto the working LSP-D in the D direction, and changes the LSP to which signals are to be added from the working LSP-D to the backup LSP-C, according to descriptions relevant to fault recovery of the working LSP in the D direction in the LSP management information indicated in FIG. 23. According to the above operations, signals added to the backup LSP-C from the node #6 and the node #7 on the working LSP-D are connected to the working LSP-C in the C direction at the node #4, and are transmitted to the receiving node #1 via the node #3 and the node #2, and the fault is recovered. That is to say, the transmission delay under normal circumstances is reduced. Furthermore, at the time of fault recovery, the working LSP-C (nodes #4, #3, #2, #1) and the backup LSP-C (nodes #7, #6, #5, #4) in the C direction do not overlap each other, and therefore the signal band is efficiently used.

The present embodiment is applicable to a working label switch path and a backup label switch path that are linked, and the network topology is not limited to a ring.

According to an aspect of the present invention, the transmission delay is reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A ring network of a multicast label switch path scheme, the ring network comprising:
   a transmitting node and a plurality of receiving nodes connected to form a ring,
   wherein a signal input to the transmitting node is branched to be transmitted in first and second different directions to a first one and a second one of the receiving nodes through a first working path and a second working path, respectively, in the ring network, the first one and the second one of the receiving nodes defining terminal points of the first working path and the second working path, respectively, from the transmitting node,
   wherein a first backup path is set from the first one of the receiving nodes to the transmitting node, and a second backup path is set from the second one of the receiving nodes to the transmitting node,
   wherein the first backup path is in an opposite direction to the first working path and the second backup path is in an opposite direction to the second working path, and
   wherein the transmitting node includes a controller configured to periodically insert and transmit a first monitor/control packet in the first and the second working paths to monitor connections, and upon receiving a second monitor/control packet reporting a fault from the first or the second backup path, insert and transmit a third monitor/control packet in the first or the second working path, the third monitor/control packet instructing the first one or the second one of the receiving nodes defining the terminal point of the first or the second working path in an opposite direction to the first or the second backup path, respectively, to connect the first or the second working path to the first or the second backup path.

2. The network according to claim 1, wherein the first one and the second one of the receiving nodes include a processor configured to, when no first monitor/control packet is received from the first and the second working paths, insert and transmit the second monitor/control packet in the first and the second backup paths in the same direction as the first and the second working paths, respectively, and, upon receiving the third monitor/control packet from the first and the second working paths, connect the first and the second working path to the first and the second backup path in the same direction.

3. The network according to claim 2, wherein each of the receiving nodes receives a signal from the first or the second working path and from the first or the second backup path.

4. A fault recovery method for backing up a ring network of a multicast label switch path scheme so that a signal input to a transmitting node is branched to be transmitted in first and second different directions through a first working path and a second working path to a first one and a second one of receiving nodes, respectively, the fault recovery method comprising:
   setting the first and second working paths configured to extend in the first and second different directions from the transmitting node to the first one and the second one of the receiving nodes defining terminal points of the first working path and the second working path, respectively, the transmitting node and the first one and the second one of the receiving nodes being included in the ring network;
   setting first and second backup paths respectively set from the first one of the receiving nodes and the second one of the receiving nodes to the transmitting node, so that the first working path and the first backup path are connected to form a ring and the second working path and the second backup path are connected to form the ring, wherein the first backup path is in an opposite direction to the first working path and the second backup path is in an opposite direction to the second working path;

periodically inserting and transmitting, by the transmitting node, a first monitor/control packet to monitor connections in the first and the second working paths;

inserting and transmitting, by the first one or the second one of the receiving nodes defining the terminal point of one of the first and the second working paths that does not receive the first monitor/control packet from the one of the first and the second working paths, a second monitor/control packet reporting a fault in one of the first and the second backup paths in the same direction as the one of the first and the second working paths;

inserting and transmitting, by the transmitting node, a third monitor/control packet instructing to switch connection in another one of the first and the second working paths that is in an opposite direction to the one of the first and the second backup paths, when the second monitor/control packet is received from the one of the first and the second backup paths; and connecting, by the first one or the second one of the receiving nodes defining the terminal point of the other one of the first and the second working paths, the other one of the first and the second working paths with another one of the first and the second backup paths in the same direction as the other one of the first and the second working paths, when the third monitor/control packet is received from the other one of the first and the second working paths.

5. A ring network of a multiple-to-one connection label switch path scheme, the ring network comprising:

a receiving node and a plurality of transmitting nodes connected to form a ring, wherein a signal input to the receiving node is branched to be transmitted in first and second different directions to a first one and a second one of the transmitting nodes through a first working path and a second working path, respectively, in the ring network, the first one and the second one of the transmitting nodes defining terminal points of the first working path and the second working path, respectively, from the receiving node, wherein a first backup path is set from the first one of the transmitting nodes to the receiving node, and a second backup path is set from the second one of the transmitting nodes to the receiving node, wherein the first backup path is in an opposite direction to the first working path and the second backup path is in an opposite direction to the second working path, and wherein the first one and the second one of the transmitting nodes respectively defining the terminal points of the first working path and the second working path include a first processor configured to periodically insert and transmit a first monitor/control packet in the first and the second working paths to monitor connections, and upon receiving a second monitor/control packet reporting a fault from the first and the second backup paths in the same direction as the first and the second working paths, insert and transmit a third monitor/control packet instructing to switch connection in the first and the second working paths in the same direction as the first and the second backup paths, and switch a first path to which signals are inserted from the first and the second working paths to the first and the second backup paths in an opposite direction to the first and the second working paths.

6. The network according to claim 5, wherein the receiving node includes a processor configured to, when no first monitor/control packet is received from the first and the second working paths, insert and transmit the second monitor/control packet in the first and the second backup paths in the same direction as the first and the second working paths, respectively.

7. The network according to claim 6, wherein the transmitting nodes include a second processor configured to, upon receiving the third monitor/control packet from the first and the second working paths, relay the third monitor/control packet and switch a second path to which signals are inserted from the first and the second working paths to the first and the second backup paths in an opposite direction to the first and the second working paths.

8. A fault recovery method for backing up a ring network of a multiple-to-one connection label switch path scheme so that a signal input to a receiving node is branched to be transmitted in first and second different directions through a first working path and a second working path to a first one and a second one of transmitting nodes, respectively, the fault recovery method comprising:

setting the first and second working paths configured to extend in the first and second different directions from the receiving node to the first one and the second one of the transmitting nodes defining terminal points of the first working path and the second working path, respectively, the receiving node and the first one and the second one of the transmitting nodes being included in the ring network;

setting first and second backup paths respectively set from the first one of the transmitting nodes and the second one of the transmitting nodes to the receiving node, so that the first working path and the first backup path are connected to form a ring and the second working path and the second backup path are connected to form the ring, wherein the first backup path is in an opposite direction to the first working path and the second backup path is in an opposite direction to the second working path;

periodically inserting and transmitting, by the first one and the second one of the transmitting nodes respectively defining the terminal points of the first working path and the second working path, a first monitor/control packet in the first and the second working paths to monitor connections;

inserting and transmitting, by the receiving node, a second monitor/control packet in the first and the second backup paths in the same direction as the first and the second working paths, respectively, when no first monitor/control packet is received from the first and the second working paths;

inserting and transmitting, by the first one and the second one of the transmitting nodes respectively defining the terminal points of the first working path and the second working path, a third monitor/control packet instructing to switch connection in the first and the second working paths in the same direction as the first and the second backup paths, and switching a path to which signals are inserted from the first and the second working paths to the first and the second backup paths in an opposite direction to the first and the second working paths, upon receiving the second monitor/control packet from the first and the second backup paths in the same direction as the first and the second working paths; and relaying, by the transmitting node that has received the third monitor/control packet, the third monitor/control packet, and switching a path to which signals are inserted from the first and the second working paths to the first and the second backup paths in an opposite direction to the first and the second working paths.

* * * * *